(12) United States Patent
Sasaki

(10) Patent No.: US 11,990,581 B2
(45) Date of Patent: May 21, 2024

(54) BATTERY INCLUDING MEMBER HAVING END REGION WITH YOUNG'S MODULUS SMALLER THAN YOUNG'S MODULUS OF CENTRAL REGION

(71) Applicant: Panasonic Intellectual Property Management Co., Ltd., Osaka (JP)

(72) Inventor: Izuru Sasaki, Aichi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 486 days.

(21) Appl. No.: 17/340,140

(22) Filed: Jun. 7, 2021

(65) Prior Publication Data

US 2021/0296695 A1    Sep. 23, 2021

Related U.S. Application Data

(63) Continuation of application No. PCT/JP2019/034424, filed on Sep. 2, 2019.

(30) Foreign Application Priority Data

Dec. 28, 2018  (JP) .................................. 2018-248455

(51) Int. Cl.
  *H01M 10/0562*  (2010.01)
  *H01M 4/36*     (2006.01)
  (Continued)

(52) U.S. Cl.
  CPC ....... *H01M 10/0562* (2013.01); *H01M 4/364* (2013.01); *H01M 4/66* (2013.01);
  (Continued)

(58) Field of Classification Search
  CPC .......... H01M 4/364; H01M 4/66; H01M 4/67; H01M 10/0481; H01M 10/0562; H01M 10/0565; H01M 10/0585; H01M 10/509
  (Continued)

(56) References Cited

U.S. PATENT DOCUMENTS

2008/0292963 A1*  11/2008  Sato ..................... H01M 4/667
                                              429/218.1
2012/0070736 A1*  3/2012   Ohara .................. H01M 4/622
                                              429/211
2015/0134172 A1   5/2015   Ose et al.

FOREIGN PATENT DOCUMENTS

EP        3089238 B1      3/2018
JP        2008-257962 A   10/2008
                (Continued)

OTHER PUBLICATIONS

The Extended European Search Report dated Jan. 7, 2022 for the related European Patent Application No. 19904322.5.
(Continued)

*Primary Examiner* — Sean P Cullen
(74) *Attorney, Agent, or Firm* — Rimon P.C.

(57) ABSTRACT

A battery includes a power generating element group including multiple laminated power generating elements each of which contains a solid electrolyte, and a first member in contact with a principal surface of a first power generating element that is one among the multiple power generating elements. The principal surface includes a central portion and an end portion with a ring-like shape surrounding the central portion in a plan view. The first member includes a central region overlapping with the central portion of the principal surface in a plan view, and an end region overlapping with the end portion of the principal surface in a plan view. At least one of the central region or the end region is in contact with the principal surface. A Young's modulus of the end region is smaller than that of the central region.

19 Claims, 10 Drawing Sheets

(51) Int. Cl.
    *H01M 4/66*           (2006.01)
    *H01M 10/04*         (2006.01)
    *H01M 10/0565*     (2010.01)
    *H01M 10/0585*     (2010.01)
    *H01M 10/44*         (2006.01)
    *H01M 50/509*      (2021.01)

(52) U.S. Cl.
    CPC ... *H01M 10/0481* (2013.01); *H01M 10/0565* (2013.01); *H01M 10/0585* (2013.01); *H01M 10/44* (2013.01); *H01M 50/509* (2021.01)

(58) Field of Classification Search
    USPC .................................................. 429/233, 304
    See application file for complete search history.

(56) References Cited

FOREIGN PATENT DOCUMENTS

JP           5459198 B2     4/2014
JP         2015-095281     5/2015

OTHER PUBLICATIONS

The Indian Office Action dated Dec. 30, 2022 for the related Indian Patent Application No. 202147026830.
International Search Report of PCT application No. PCT/JP2019/034424 dated Nov. 12, 2019.

\* cited by examiner

BATTERY INCLUDING MEMBER HAVING END REGION WITH YOUNG'S MODULUS SMALLER THAN YOUNG'S MODULUS OF CENTRAL REGION

BACKGROUND

1. Technical Field

The present disclosure relates to a battery.

2. Description of the Related Art

Japanese Unexamined Patent Application Publication No. 2015-95281 discloses a system including a pressing unit that applies confining pressure to an all-solid-state battery, and a pressure control unit that controls the confining pressure, wherein the confining pressure is optionally controlled in accordance with charge and discharge.

SUMMARY

One non-limiting and exemplary embodiment provides a battery that is less likely to cause a short circuit.

In one general aspect, the techniques disclosed here feature a battery including a power generating element group including multiple laminated power generating elements each of which contains a solid electrolyte, and a first member in contact with a first principal surface of a first power generating element that is one among the multiple power generating elements. The first principal surface includes a central portion and an end portion with a ring-like shape surrounding the central portion in a plan view. The first member includes a first central region overlapping with the central portion of the first principal surface in a plan view, and a first end region overlapping with the end portion of the first principal surface in a plan view. At least one of the first central region or the first end region is in contact with the first principal surface. A Young's modulus of the first end region is smaller than a Young's modulus of the first central region.

According to the present disclosure, the battery can be provided in which a short circuit is less likely to occur.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Summary of Present Disclosure

Figure 1:
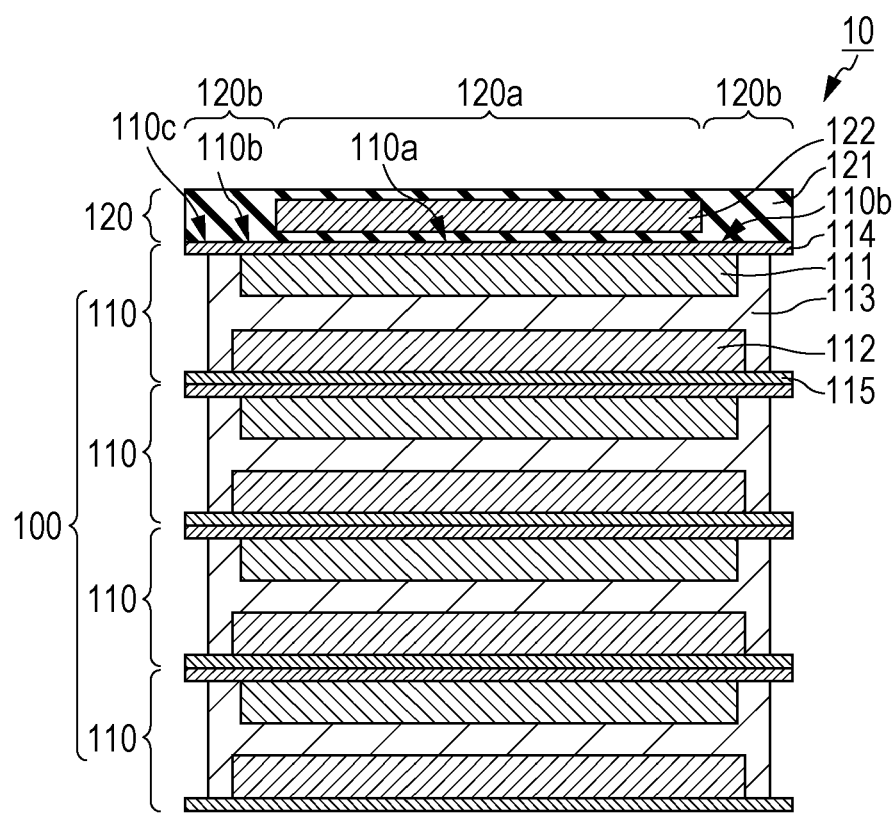
FIG. 1 is a sectional view illustrating a schematic structure of a battery according to Embodiment 1.

First, a point of view of the inventor will be described below.

In an all-solid-state battery, by confining the all-solid-state battery, charge-discharge characteristics are improved because of the fact that satisfactory contact is obtained between active substance particles and solid electrolyte particles and between the solid electrolyte particles, and that particle boundary resistance reduces. When the all-solid-state battery is not confined, satisfactory contact cannot be obtained between the particles and an effective reaction area reduces. Therefore, internal resistance of the all-solid-state battery increases. From that point of view, confining the battery is effective in improving performance of the all-solid-state battery.

On the other hand, in an end portion of the all-solid-state battery, a short-circuit failure is likely to occur due to excessive current concentration or contact between current collectors. When the all-solid-state battery is confined, current concentration at positive and negative electrodes in the end portion of the battery, physical contact between the positive and negative electrodes due to expansion and contraction when charged and discharged, or the contact between the current collectors is more likely to generate. Accordingly, a risk of the short-circuit failure increases.

In the all-solid-state battery, a voltage or a capacity of the battery can be increased by including a power generating element group in which two or more power generating elements are connected in parallel or in series. When the all-solid-state battery including the multiple power generating elements is confined, a thickness of the all-solid-state battery increases in comparison with the case of including one power generating element, and hence a pressure loss is likely to generate inside the power generating element group. In order to avoid deterioration of characteristics due to the pressure loss, the all-solid-state battery needs to be confined with a stronger force than in the case of including one power generating element. However, when the all-solid-state battery is confined with the stronger force, the current concentration in the end portion of the battery and the contact between the current collectors are more likely to generate. This further increases the risk of the short-circuit failure.

For example, Japanese Unexamined Patent Application Publication No. 2015-95281 discloses a system including a pressing unit that applies confining pressure to an all-solidstate battery and a pressure control unit that controls the confining pressure, wherein the confining pressure is optionally controlled in accordance with charge and discharge. However, because a principal surface of the all-solid-state battery is entirely confined with uniform pressure, it is difficult to avoid the risk of the short circuit in the end portion of the battery. Furthermore, when the all-solid-state battery includes the multiple power generating elements, an increase of not only the pressure loss generated inside the power generating element group, but also the risk of the short circuit cannot be solved.

In consideration of the above-described problem, the present disclosure provides a battery that can improve charge-discharge characteristics while reducing a risk of a short circuit in an end portion when the battery is confined.

A battery according to one aspect of the present disclosure includes a power generating element group including multiple laminated power generating elements each of which contains a solid electrolyte, and a first member in contact with a first principal surface of a first power generating element that is one among the multiple power generating elements. The first principal surface includes a central portion and an end portion with a ring-like shape surrounding the central portion in a plan view. The first member includes a first central region overlapping with the central portion of the first principal surface in a plan view, and a first end region overlapping with the end portion of the first principal surface in a plan view. At least one of the first central region or the first end region is in contact with the first principal surface. A Young's modulus of the first end region is smaller than a Young's modulus of the first central region.

With the above-described feature, when the battery is confined, pressure applied to an end portion of the power generating element group is relieved. Since the pressure applied to the end portion is relieved, it is possible to suppress current concentration in the end portion and physical contact between electrodes of the power generating elements included in the power generating element group. Accordingly, the battery can be realized in which a short circuit is less likely to occur in end portions of the power generating elements when the battery is confined.

For example, the first central region may be in contact with the central portion of the first principal surface, and the first end region may be in contact with the end portion of the first principal surface.

With the above-described feature, an abrupt pressure change at a boundary between a central portion and the end portion of the power generating element group is less likely to generate than in the case in which the first member does not include the first end region. Hence the occurrence of cracking at the boundary can be suppressed. Furthermore, since strong pressure can be applied to the central portion of the power generating element group, more satisfactory contact between particles can be obtained, whereby particle boundary resistance is reduced and charge-discharge characteristics are improved. Thus, the reliability and the charge-discharge characteristics of the battery according to this aspect can be increased.

For example, the first member may include a first portion and a second portion. A Young's modulus of the first portion may be smaller than a Young's modulus of the second portion. At least part of the first portion may be positioned within the first end region, and at least part of the second portion may be positioned within the first central region.

With the above-described feature, the first member in which the first end region and the first central region have different Young's moduli can easily be formed by using different materials.

For example, the first portion may cover a periphery of the second portion. Another part of the first portion may be positioned within the first central region.

With the above-described feature, the first member in which the first end region and the first central region have different Young's moduli can easily be formed.

For example, the first portion may contain resin, and the second portion may contain metal.

With the above-described feature, since a difference in Young's modulus between metal and resin is generally large, the pressure applied to the end portion of the power generating element can be further relieved.

For example, the resin may be a conductive polymer.

With the above-described feature, since electrical conductivity can be given to the first member, the first member can be further used as a current collector. In this case, the power generating element is no longer required to include the current collector, whereby a thickness of the power generating element can be reduced. Thus, since the thickness of the power generating element is reduced, an energy density of the power generating element can be increased.

For example, the first portion and the second portion may contain metal.

With the above-described feature, since electrical conductivity can be given to the first member, the first member can be further used as a current collector. In this case, the power generating element is no longer required to include the current collector, whereby the thickness of the power generating element can be reduced. Thus, since the thickness of the power generating element is reduced, the energy density of the power generating element can be increased. Furthermore, when each of the first portion and the second portion contains metal, it is easier to reduce a difference in Young's modulus between the first and second portions, whereby the pressure change at the boundary between the first end region and the first central region is further relieved. As a result, a failure, such as cracking of the power generating element, attributable to the abrupt pressure change is even less likely to occur.

For example, the first power generating element may include an electrode layer. An area of the second portion may be smaller than an area of the electrode layer in a plan view.

With the above-described feature, since the pressure applied to an end portion of the electrode layer can be further relieved, the short circuit can be made even less likely to occur in the end portion of the power generating element.

For example, the first power generating element may include an electrode layer. An area of the second portion may be larger than an area of the electrode layer in a plan view.

With the above-described feature, since a contact degree between particles is increased due to pressure applied to a central portion of the electrode layer, the particle boundary resistance is reduced and the charge-discharge characteristics can be improved.

For example, the first member may be in contact with a surface of the electrode layer.

With the above-described feature, when the battery is confined, a pressure loss can be reduced and the pressure can be more effectively applied to the electrode layer.

For example, the first member may be a current collector.

With the above-described feature, since the power generating element is no longer required to include the current collector, the thickness of the power generating element can be reduced. Thus, since the thickness of the power generating element is reduced, the energy density of the power generating element can be increased.

For example, the first power generating element may include a current collector. The first member may be in contact with a surface of the current collector.

With the above-described feature, a positional relationship between the power generating element and the first member is fixed and a displacement of the first member can be suppressed. If the first member is displaced, there is a risk that strong pressure may be applied to the end portion as well. With the battery according to this aspect, since the displacement of the first member is suppressed, the short circuit can be made less likely to occur in the end portion.

For example, the first power generating element may be the power generating element that is positioned at an uppermost stage in the power generating element group. The first principal surface may be an upper surface of the first power generating element.

With the above-described feature, when the battery is confined, the pressure can be suppressed from being directly applied to the power generating element group.

For example, the battery may further include a second member in contact with a second principal surface of a second power generating element that is another one among the multiple power generating elements. The second principal surface may include a central portion and an end portion with a ring-like shape surrounding the central portion in a plan view. The second member may include a second central region overlapping with the central portion of the second principal surface in a plan view, and a second end region overlapping with the end portion of the second principal surface in a plan view. At least one of the second central region or the second end region may be in contact with the second principal surface. A Young's modulus of the second end region is smaller than a Young's modulus of the second central region. The second power generating element may be the power generating element that is positioned at a lowermost stage in the power generating element group. The second principal surface may be a lower surface of the second power generating element.

With the above-described feature, when the battery is confined, pressure applied to the end portion of the power generating element group from both sides in a lamination direction is relieved. Since the pressure applied to the end portion is relieved, it is possible to suppress the current concentration in the end portion and the physical contact between the electrodes of the power generating elements included in the power generating element group. Thus, the battery can be realized in which the short circuit is less likely to occur in the end portion of the power generating element group when the battery is confined.

For example, the power generating element group may include a section in which the two or more power generating elements are electrically connected in series.

For example, the power generating element group may include a section in which the two or more power generating elements are electrically connected in parallel.

For example, the first member may be sandwiched between the two power generating elements adjacent to each other within the power generating element group.

With the above-described feature, even when the number of the power generating elements included in the battery increases, a pressure relieving effect can be sufficiently developed because the first member is disposed within the power generating element group. Accordingly, the battery can be realized in which the short circuit is less likely to occur in the end portion of the power generating element when the battery is confined, while a higher capacity and a higher voltage of the battery are realized by increasing the number of the power generating elements.

For example, the battery may further include a third member. The multiple power generating elements may be the four or more power generating elements. The power generating element group may include multiple series sections in each of which the two or more power generating elements are electrically connected in series. The third member may be positioned between adjacent two of the multiple series sections. The two adjacent series sections may be electrically connected in parallel.

With the above-described feature, even when the number of the power generating elements included in the battery increases, the pressure relieving effect can be sufficiently developed because the first member is disposed within the power generating element group. Accordingly, the battery can be realized in which the short circuit is less likely to occur in the end portion of the power generating element when the battery is confined, while a higher capacity and a higher voltage of the battery are realized by increasing the number of the power generating elements.

For example, the battery may further include a third member. The multiple power generating elements may be the four or more power generating elements. The power generating element group may include multiple parallel sections in each of which the two or more power generating elements are electrically connected in parallel. The third member may be positioned between adjacent two of the multiple parallel sections. The two adjacent parallel sections may be electrically connected in series.

With the above-described feature, even when the number of the power generating elements included in the battery increases, the pressure relieving effect can be sufficiently developed because the first member is disposed within the power generating element group. Accordingly, the battery can be realized in which the short circuit is less likely to occur in the end portion of the power generating element when the battery is confined, while a higher capacity and a higher voltage of the battery are realized by increasing the number of the power generating elements.

Embodiments will be described in detail below with reference to the drawings.

It is to be noted that each of the following embodiments represents a generic or specific example. Numerical values, shapes, materials, components, arrangement positions and connection forms of the components, steps, sequences of the steps, and so on, which are described in the following embodiments, are merely illustrative, and they are not purported to limit the present disclosure. Among the components in the following embodiments, those ones not stated in the independent claim are described as optional components.

The drawings are illustrated in a schematic manner and are not always exactly drawn in a strict sense. For example, scales and so on are not always matched between or among the drawings. Moreover, in the drawings, substantially the same components are denoted by the same reference signs, and duplicate description is omitted or simplified.

In this specification, the terms, such as "parallel", representing a relationship between elements, the terms, such as "rectangular", representing shapes of the elements, and ranges indicated by numerical values are expressions that are not always exactly true in a strict sense, and that indicate substantially the same relationship, shape, and range with an allowance of, for example, about several %.

In this specification, the terms "upper" and "lower" are not intended to indicate respectively an upward direction (vertically upward) and a downward direction (vertically downward) in absolute spatial recognition and are used as expressions that are specified in accordance with a relative positional relationship based on the order of lamination in a laminated multilayer structure. Furthermore, the terms "upper" and "lower" are applied to not only the case in which two components are arranged in a state spaced from each other and another component is present between the two components, but also the case in which two components are arranged so close to each other that the two components are in a contact state.

In this specification, the term "uppermost stage in a power generating element group" indicates one of both ends of the power generating element group in a lamination direction. Furthermore, in this specification, the term "lowermost stage in the power generating element group" indicates the other of both the ends of the power generating element group in the lamination direction.

In this specification, the term "thickness direction" indicates a direction perpendicular to a surface of an electrode current collector on which an electrode layer is formed, or a surface of a counter-electrode current collector on which a counter electrode layer is formed. Furthermore, in this specification, the term "in a plan view" indicates the case of viewing the battery along the thickness direction of the battery.

Embodiment 1

FIG. 1 is a sectional view illustrating a schematic structure of a battery 10 according to Embodiment 1. As illustrated in FIG. 1, the battery 10 includes a power generating element group 100 in which multiple power generating elements 110 each containing a solid electrolyte are laminated, and a first member 120 in contact with a principal surface 110c of one of the multiple power generating elements 110.

The power generating element group 100 according to this embodiment includes a section in which at least two power generating elements are electrically connected in series. Here, the wording "connected in series" indicates a state in which a positive electrode current collector of one of at least two power generating elements is electrically connected to a negative electrode current collector of the other power generating element.

In this embodiment, as illustrated in FIG. 1, the power generating element group 100 includes four power generating elements 110. The number of the power generating elements 110 included in the power generating element group 100 is not limited to a particular value and may be two, three, or five. In this embodiment, the four power generating elements 110 have the same structure.

The number of the power generating elements 110 connected in series is also not limited to a particular value. As the number of the power generating elements connected in series increases, the battery 10 can produce a higher voltage. The number of the power generating elements connected in series may be set optionally in consideration of easiness in handling when the all-solid-state battery is manufactured, a loading space or a control voltage of an apparatus or the like in which the all-solid-state battery is to be used, and so on.

The power generating elements in number of, for example, 2 or more to 500 or less may be connected in series.

Power Generating Element

A structure of the power generating element 110 according to this embodiment is first described.

The power generating element 110 includes a positive electrode 111, a negative electrode 112, a solid electrolyte layer 113, a positive electrode current collector 114, and a negative electrode current collector 115.

The positive electrode 111 is an example of an electrode layer and is a layer containing a positive electrode active substance. The positive electrode 111 may be a positive electrode mixture layer containing the positive electrode active substance and the solid electrolyte.

The positive electrode active substance contained in the positive electrode 111 is given as, for example, a lithium-containing transition metal oxide, a transition metal fluoride, a polyanion or fluorinated-polyanion material, a transition metal sulfide, a transition metal oxyfluoride, a transition metal oxysulfide, or a transition metal oxynitride. For example, when the lithium-containing transition metal oxide is used as positive-electrode active substance particles, a production cost can be reduced and an average discharge voltage can be increased.

A thickness of the positive electrode 111 is, for example, more than or equal to 10 μm and less than or equal to 500 μm. When the thickness of the positive electrode 111 is more than or equal to 10 μm, an energy density of the battery can be ensured sufficiently. When the thickness of the positive electrode 111 is less than or equal to 500 μm, the battery can be operated with a high output.

The negative electrode 112 is an example of an electrode layer and is a layer containing a negative electrode active substance. The negative electrode 112 may be a negative electrode mixture layer containing the negative electrode active substance and the solid electrolyte.

The negative electrode active substance contained in the negative electrode 112 is given as, for example, a material occluding and releasing a metal ion. The negative electrode active substance is, for example, a material occluding and releasing a lithium ion. The negative electrode active substance may be given as, for example, lithium metal, metal or an alloy each of which exhibits an alloying reaction with lithium, carbon, a transition metal oxide, or a transition metal sulfide. The carbon may be given as, for example, graphite or a non-graphite carbon such as hard carbon or coke. The transition metal oxide may be given as, for example, CuO or NiO. The transition metal sulfide may be given as, for example, a copper sulfide denoted by CuS. The metal or the alloy each of which exhibits the alloying reaction with lithium may be given as, for example, an alloy of a silicon compound, a tin compound, or an aluminum compound and lithium. For example, when the carbon is used, the production cost can be reduced and the average discharge voltage can be increased.

A thickness of the negative electrode 112 is, for example, more than or equal to 10 μm and less than or equal to 500 μm. When the thickness of the negative electrode 112 is more than or equal to 10 μm, the energy density of the battery can be ensured sufficiently. When the thickness of the negative electrode 112 is less than or equal to 500 μm, the battery can be operated with a high output.

The solid electrolyte layer 113 contains a solid electrolyte. In this embodiment, the solid electrolyte layer 113 covers the entirety of each of the positive electrode 111 and the negative electrode 112. More specifically, the solid electrolyte layer 113 covers the entirety of the positive electrode 111, and a ring-shaped portion of the solid electrolyte layer 113 along an outer periphery of the positive electrode 111 is in contact with the positive electrode current collector 114 in a plan view. Furthermore, the solid electrolyte layer 113 covers the entirety of the negative electrode 112, and a ring-shaped portion of the solid electrolyte layer 113 along an outer periphery of the negative electrode 112 is in contact with the negative electrode current collector 115 in a plan view.

The solid electrolyte layer 113 may not need to completely cover at least one of the positive electrode 111 or the negative electrode 112. For example, the solid electrolyte layer 113 may not need to cover at least part of an end surface of the positive electrode 111. Moreover, the solid electrolyte layer 113 may not need to cover at least part of an end surface of the negative electrode 112. The solid electrolyte layer 113 may not need to contact with each of the positive electrode current collector 114 and the negative electrode current collector 115 and may be positioned only between the positive electrode 111 and the negative electrode 112.

A thickness of the solid electrolyte layer 113 is, for example, more than or equal to 1 μm and less than or equal to 200 μm. When the thickness of the solid electrolyte layer 113 is more than or equal to 1 μm, the possibility of a short circuit between the positive electrode 111 and the negative electrode 112 can be reduced. When the thickness of the solid electrolyte layer 113 is less than or equal to 200 μm, the battery can be operated with a high output.

The solid electrolyte contained in each of the positive electrode 111, the negative electrode 112, and the solid electrolyte layer 113 may be given as, for example, a sulfide solid electrolyte, an oxide solid electrolyte, a halide solid electrolyte, a polymer solid electrolyte, or a complex hydride solid electrolyte.

The sulfide solid electrolyte may be given as, for example, $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, or $Li_{10}GeP_2S_{12}$. For example, LiX, $Li_2O$, $MO_p$, or $Li_qMO_r$ may be added to each of the above-mentioned compounds. X in LiX denotes any of F, Cl, Br and I. M in $Li_qMO_r$ denotes any of P, Si, Ge, B, Al, Ga, In, Fe and Zn. Furthermore, p, q and r in $MO_p$ and $Li_qMO_r$ are natural numbers independently of one another.

The oxide solid electrolyte may be given as, for example, any of NASICON-type solid electrolytes represented by $LiTi_2(PO_4)_3$ and an element substituent thereof, a (LaLi)$TiO_3$-based perovskite solid electrolyte, LISICON-type solid electrolytes represented by $Li_{14}ZnGe_4O_{16}$, $Li_4SiO_4$, $LiGeO_4$, and an element substituent thereof, or garnet solid electrolytes represented by $Li_7La_3Zr_2O_{12}$ and an element substituent thereof. Instead, the oxide solid electrolyte may be given as, for example, any of $Li_3N$ and an H substituent thereof, $Li_3PO_4$ and an N substituent thereof, and glass or glass ceramics based on an Li—B—O compound, such as $LiBO_2$ or $Li_3BO_3$, and added with $Li_2SO_4$ or $Li_2CO_3$.

The halide solid electrolyte may be given as, for example, a material denoted by a composition formula $Li_\alpha M_\beta X_\gamma$. Here, α, β and γ are values greater than 0 which are independently of one another. Furthermore, M is at least one of a metal element other than Li or a metalloid element. X is one or two or more elements selected from the group consisting of Cl, Br, I and F. Here, the metalloid element is B, Si, Ge, As, Sb or Te. The metal element is one among all of the elements included in group 1 to group 12 of the periodic table except for hydrogen, and all of the elements included in group 13 to group 16 except for the above-mentioned metalloid elements, C, N, P, O, S and Se. In other words, the halide solid electrolyte indicates a group of elements each capable of becoming a cation when the element forms an inorganic compound with a halogen compound. The halide solid electrolyte may be given as, for example, $Li_3YX_6$, $Li_2MgX_4$, $Li_2FeX_4$, $Li(Al, Ga, In)X_4$, or $Li_3(Al, Ga, In)X_6$. Instead, the halide solid electrolyte may be given as, for example, $Li_3InBr_6$, $Li_3InCl_6$, $Li_2FeCl_4$, $Li_2CrCl_4$, or $Li_3OCl$.

The complex hydride solid electrolyte may be given as, for example, $LiBH_4$—LiI or $LiBH_4$—$P_2S_5$.

The polymer solid electrolyte may be given as, for example, a compound of a polymer compound and a lithium salt. The polymer compound may have an ethylene oxide structure. The polymer compound having the ethylene oxide structure can contain a larger amount of the lithium salt and can increase ion conductivity. The lithium salt may be given as, for example, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$. One type of lithium salt selected from the above-mentioned examples may be solely used as the lithium salt. Instead, a mixture of two or more types of lithium salts selected from the above-mentioned examples may be used as the lithium salt.

The positive electrode current collector 114 is disposed in contact with the positive electrode 111. In this embodiment, the positive electrode current collector 114 is included in the power generating element 110. The positive electrode current collector 114 is a thin film with electrical conductivity.

The positive electrode current collector 114 may be given as, for example, a porous or nonporous sheet or film made of a metal material such as aluminum, stainless steel, titanium, or an alloy of any of those metals. Aluminum or an aluminum alloy is inexpensive and is easy to form a thin film. The sheet or the film is, for example, a metal foil or mesh.

A thickness of the positive electrode current collector 114 is, for example, more than or equal to 1 μm and less than or equal to 30 μm. When the thickness of the positive electrode current collector 114 is more than or equal to 1 μm, mechanical strength is sufficient and the positive electrode current collector 114 is less likely to crack or break. When the thickness of the positive electrode current collector 114 is less than or equal to 30 μm, a drop of the energy density of the battery can be suppressed.

The negative electrode current collector 115 is disposed in contact with the negative electrode 112. In this embodiment, the negative electrode current collector 115 is included in the power generating element 110. The negative electrode current collector 115 is a thin film with electrical conductivity.

The negative electrode current collector 115 may be given as, for example, a porous or nonporous sheet or film made of a metal material such as stainless steel, nickel, copper, or an alloy of any of those metals. Copper or a copper alloy is inexpensive and is easy to form a thin film. The sheet or the film is, for example, a metal foil or mesh.

A thickness of the negative electrode current collector 115 is, for example, more than or equal to 1 μm and less than or equal to 30 μm. When the thickness of the negative electrode current collector 115 is more than or equal to 1 μm, mechanical strength is sufficient and the negative electrode current collector 115 is less likely to crack or break. When the thickness of the negative electrode current collector 115 is less than or equal to 30 μm, a drop of the energy density of the battery can be suppressed.

At least one of the positive electrode 111, the solid electrolyte layer 113, or the negative electrode 112 may contain a binding agent for the purpose of increasing adhesion between particles. The binding agent is used to increase the binding property of a material of the electrode or the solid electrolyte layer. The binding agent is, for example, polyvinylidene fluoride, polytetrafluoroethylene, polyethylene, polypropylene, aramid resin, polyamide, polyimide, polyamideimide, polyacrylonitrile, polyacrylic acid, polyacrylic methyl ester, polyacrylic ethyl ester, polyacrylic hexyl ester, polymethacrylic acid, polymethacrylic methyl ester, polymethacrylic ethyl ester, polymethacrylic hexyl ester, polyvinyl acetate, polyvinyl pyrrolidone, polyether, polyethersulfone, hexafluoropolypropylene, styrene-butadiene rubber, or carboxymethyl cellulose. Instead, the binding agent may be given as, for example, a copolymer of two or more materials selected from tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. Furthermore, two or more selected from the above-mentioned materials may be mixed and used as the binding agent.

At least one of the positive electrode 111 or the negative electrode 112 may contain a conductive aid for the purpose of increasing electron conductivity. The conductive aid may be given as, for example, any of graphite such as natural graphite or artificial graphite, carbon blacks such as acetylene black and Ketjen black, conductive fibers such as a carbon fiber and a metal fiber, carbon fluoride, metal powder such as made of aluminum, conductive whiskers such as made of zinc oxide and potassium titanate, conductive metal oxides such as titanium oxide, and conductive polymer compounds such as polyaniline, polypyrrole, and polythiophene. When the carbon conductive aid is used, the cost can be reduced.

In this embodiment, as illustrated in FIG. 1, one of the multiple power generating elements 110 included in the power generating element group 100, the one being positioned at an uppermost stage, is in contact with the first member 120. In other words, the principal surface 110c in contact with the first member 120 is an example of a first principal surface and is an upper surface of one of the multiple power generating elements 110 included in the power generating element group 100, the one being positioned at the uppermost stage. More specifically, the principal surface 110c is a principal surface of the positive electrode current collector 114 of the power generating element 110 positioned at the uppermost stage on a side where the positive electrode 111 is not disposed.

A central portion 110a of the principal surface 110c of the power generating element 110 corresponds to a portion where all the positive electrode 111, the solid electrolyte layer 113, and the negative electrode 112 overlap with one another in a plan view. More specifically, a shape of the central portion 110a in a plan view matches with that of one among the positive electrode 111, the solid electrolyte layer 113, and the negative electrode 112 in a plan view, the one having a minimum size. In the example illustrated in FIG. 1, the shape of the central portion 110a in a plan view matches with the shape of the positive electrode 111 in a plan view.

An end portion 110b is a portion surrounding the central portion 110a. The end portion 110b has a ring-like shape surrounding the central portion 110a in a plan view. For example, the end portion 110b corresponds to the entire remaining portion of the principal surface 110c except for the central portion 110a in a plan view.

First Member

The first member 120 will be described below.

The first member 120 is in contact with the principal surface 110c of one of the multiple power generating elements 110. In this embodiment, the first member 120 is a member in the form of a flat plate. As illustrated in FIG. 1, the first member 120 includes a central region 120a and an end region 120b in a plan view. The central region 120a and the end region 120b are different regions in a plan view.

The central region 120a is an example of a first central region and overlaps with the central portion 110a of the principal surface 110c of the power generating element 110 in a plan view. In this embodiment, the central region 120a is in contact with the central portion 110a. A shape of the central region 120a in a plan view is rectangular, for example. However, the shape of the central region 120a in a plan view is not limited to a particular one and may be circular.

The end region 120b is an example of a first end region and overlaps with the end portion 110b of the principal surface 110c of the power generating element 110 in a plan view. In this embodiment, the end region 120b is in contact with the end portion 110b. The end region 120b has a ring-like shape surrounding the central region 120a in a plan view. For example, the end region 120b has a rectangular ring-like shape with a uniform width.

As illustrated in FIG. 1, a thickness of the first member 120 in the end region 120b is the same as that in the central region 120a. Accordingly, since adhesion between the power generating element 110 and the first member 120 increases, a pressure loss can be reduced and pressure can be more efficiently applied when the battery 10 is confined.

In this embodiment, a Young's modulus of the end region 120b is smaller than that of the central region 120a. More specifically, the first member 120 includes a first portion 121 and a second portion 122 of which Young's moduli are different from each other. The Young's modulus of the first portion 121 is smaller than that of the second portion 122. The Young's modulus of the central region 120a is provided as a value that is calculated from the Young's moduli of the first portion 121 and the second portion 122 both included in the central region 120a in accordance with the compound rule based on a volume ratio between the first portion 121 and the second portion 122.

The first portion 121 is positioned in the end region 120b. In this embodiment, the first portion 121 is positioned in both the end region 120b and the central region 120a while covering a periphery of the second portion 122. The first portion 121 covers an entire surface of the second portion 122.

The second portion 122 is positioned in the central region 120a. In this embodiment, the central region 120a matches with the second portion 122 in a plan view. In other words, when looking at the first member 120 in a plan view, a region where the second portion 122 is disposed corresponds to the central region 120a. Because the entire surface of the second portion 122 is covered with the first portion 121, the second portion 122 is not exposed to the outside.

The first member 120 of a structure including the second portion 122 covered with the first portion 121 is easy to manufacture. The first member 120 can be simply manufactured by, for example, a method of bonding two sheets of the first portion 121 to the second portion 122 from above and below, or a method of coating the second portion 122 with the first portion 121.

Pressures applied to the end portion 110b and the central portion 110a of the power generating element 110 can be optionally adjusted by adjusting the Young's moduli, thicknesses, areas, and so on of the first portion 121 and the second portion 122. A pressure distribution applied to the end portion 110b and the central portion 110a of the power generating element 110 can be adjusted by adjusting, for example, the Young's moduli of the materials used for the first portion 121 and the second portion 122.

In this embodiment, the first portion 121 is insulating to electrons. The first portion 121 contains resin, for example, and the second portion 122 contains metal, for example. Generally, a difference in Young's modulus between resin and metal is large. Therefore, the pressure applied to the end portion 110b of the power generating element 110 can be further relieved. Moreover, the first member 120 can easily be manufactured by, for example, a method of bonding the first portion 121 in the form of a sheet containing resin to the second portion 122 containing metal from above and below, or a method of coating the second portion 122 containing metal with the first portion 121 containing resin.

The resin contained in the first portion 121 may be given as, for example, any of organic polymers such as polyvinylidene fluoride, polytetrafluoroethylene, polyethylene, polypropylene, aramid resin, polyamide, polyimide, polyamideimide, polyacrylonitrile, polyacrylic acid, polyacrylic methyl ester, polyacrylic ethyl ester, polyacrylic hexyl ester, polymethacrylic acid, polymethacrylic methyl ester, polymethacrylic ethyl ester, polymethacrylic hexyl ester, polyvinyl acetate, polyvinyl pyrrolidone, polyether, polyethersulfone, hexafluoropolypropylene, and carboxymethyl cellulose. Instead, the resin contained in the first portion 121 may be given as, for example, any of various rubbers such as silicone rubber, chloroprene rubber, nitrilbutadiene rubber, ethylene-propylene rubber, chlorosulphonated polyethylene rubber, acrylic rubber, urethane rubber, fluorine rubber, polysulfide rubber, natural rubber, isoprene rubber, styrene-butadiene rubber, butyl rubber, and butadiene rubber.

The metal contained in the second portion 122 may be given as, for example, aluminum, stainless steel, titanium, nickel, copper, magnesium, or an alloy of any of those metals.

At least one of the first portion 121 or the second portion 122 may contain an inorganic material. The inorganic material contained in the first portion 121 or the second portion 122 may be given as, for example, any of simple oxides such as $SiO_2$, $MgO$, $Al_2O_3$, and $ZrO_2$, complex oxides containing two or more simple oxides, metal nitrides such as AlN and $Si_3N_4$, and metal carbides such as SiC.

A thickness of the first member 120 is, for example, more than or equal to 5 μm and less than or equal to 5000 μm. When the thickness of the first member 120 is more than or equal to 5 μm, mechanical strength is sufficient and the first member 120 is less likely to crack or break. In addition, pressure at a boundary between the end region 120b and the central region 120a can be relieved sufficiently. When the thickness of the first member 120 is less than or equal to 5000 μm, the energy density of the battery 10 can be increased.

In this embodiment, an area of the second portion 122 is smaller than that of the electrode layer in a plan view. More specifically, the area of the second portion 122 is smaller than that of the positive electrode 111 in a plan view. Furthermore, the area of the second portion 122 is smaller than that of the negative electrode 112 in a plan view. The area of the second portion 122 may be smaller than that of one between the positive electrode 111 and the negative electrode 112 and may be larger than that of the other electrode in a plan view. Moreover, the area of the second portion 122 may be smaller than that of one of the electrode layers (the positive electrode 111 and the negative electrode 112) included in the multiple power generating elements 110, the one having a minimum area, in a plan view. Instead, the area of the second portion 122 may be smaller than that of one of the electrode layers included in the multiple power generating elements 110, the one having a maximum area, in a plan view.

Under those conditions, in each of the positive electrode 111 and the negative electrode 112, the pressure applied when the battery is confined is relieved in a portion of the electrode overlapping with the end region 120b in comparison with a portion of the electrode overlapping with the central region 120a in a plan view. It is hence possible to suppress not only excessive current concentration in the end portion of each of the positive electrode 111 and the negative electrode 112, but also physical contact between the components due to expansion and contraction when charged and discharged.

Advantageous Effects and Others

In this embodiment, the first member 120 is disposed to suppress the pressure acting in the thickness direction of the power generating element group 100, namely, to suppress the power generating element group 100 from directly receiving the pressure applied from above and below, when the battery 10 is confined. In other words, with the provision of the first member 120, a failure such as cracking is less likely to occur in at least one among the multiple power generating elements 110 included in the power generating element group 100.

If the first member 120 is made of a single material and the end region 120b and the central region 120a have the same Young's modulus, confining pressure is uniformly applied to the power generating element group 100 through the first member 120 when the battery 10 is confined. In that case, the pressure is uniformly applied to an end portion of the power generating element group 100 as well. Accordingly, the current concentration and the physical contact between the positive electrode 111 or the positive electrode current collector 114 and the negative electrode 112 or the negative electrode current collector 115 are more likely to generate. Hence a short-circuit failure is more likely to occur.

Furthermore, because the battery 10 includes the power generating element group 100 that is constituted by connecting the two or more power generating elements 110, the battery 10 needs to be confined with a stronger confining force in order that sufficient confining pressure is applied up to the inside of the power generating element group 100. However, when the battery 10 is confined with the stronger confining force, the current concentration and the contact between the current collectors are more likely to generate in the end portion of the battery 10. This increases the risk of the short-circuit failure.

If the first member 120 includes only the central region 120a and does not include the end region 120b, pressure is applied to only the central portion 110a of the power generating element 110 and no pressure is applied to the end portion 110b when the battery 10 is confined. Therefore, an abrupt pressure change generates at a boundary between the central portion 110a and the end portion 110b of the power generating element 110. This may invite the risk of causing a failure, such as cracking, in the components of the power generating element 110 positioned right under the boundary, namely the positive electrode current collector 114, the positive electrode 111, the negative electrode 112, the solid electrolyte layer 113, and the negative electrode current collector 115.

On the other hand, in this embodiment, the Young's modulus of the end region 120b of the first member 120 is smaller than that of the central region 120a. Therefore, when pressure is applied to the first member 120 from above and below with the battery 10 being confined, the applied pressure is relieved in the end region 120b in which the Young's modulus is relatively small. Accordingly, the pressure applied to the end portion 110b of the power generating element 110 is weaker than that applied to the central portion 110a thereof. As a result, the current concentration and the physical contact between the positive electrode 111 or the positive electrode current collector 114 and the negative electrode 112 or the negative electrode current collector 115 are less likely to generate in the end portion 110b of the power generating element 110.

Moreover, since the pressure change at the boundary between the end region 120b and the central region 120a is relieved in comparison with the case in which the first member 120 does not include the end region 120b, the failure, such as cracking of the power generating element 110, attributable to the abrupt pressure change is less likely to occur. On the other hand, since the central region 120a has the larger Young's modulus than the end region 120b, higher pressure is applied to the central region 120a when the battery 10 is confined. Accordingly, satisfactory contact is obtained between active substance particles and solid electrolyte particles and between the solid electrolyte particles. As a result, internal resistance of the battery 10 is reduced and charge-discharge characteristics of the battery 10 are improved.

In addition, since the pressure is relieved with the provision of the first member 120, the battery 10 can be confined with a stronger force. Therefore, the internal resistance of the battery 10 can be reduced and the charge-discharge characteristics of the battery 10 can be improved while the occurrence of the failure, such as cracking, is suppressed more effectively.

According to this embodiment, as described above, it is possible to reduce the risk of a short circuit in the end portion and to improve the charge-discharge characteristics when the battery 10 is confined.

An area of a principal surface of the battery 10 may be in a range of more than or equal to 1 $cm^2$ to less than or equal to 100 $cm^2$ in the case in which the battery is used for a portable electronic device such as a smartphone or a digital camera. Instead, the area of the principal surface of the battery 10 may be in a range of more than or equal to 100 $cm^2$ to less than or equal to 1000 $cm^2$ in the case in which the battery is used for a power supply of a large-size mobile apparatus such as an electric vehicle.

Embodiment 2

Embodiment 2 will be described below.

Figure 2:
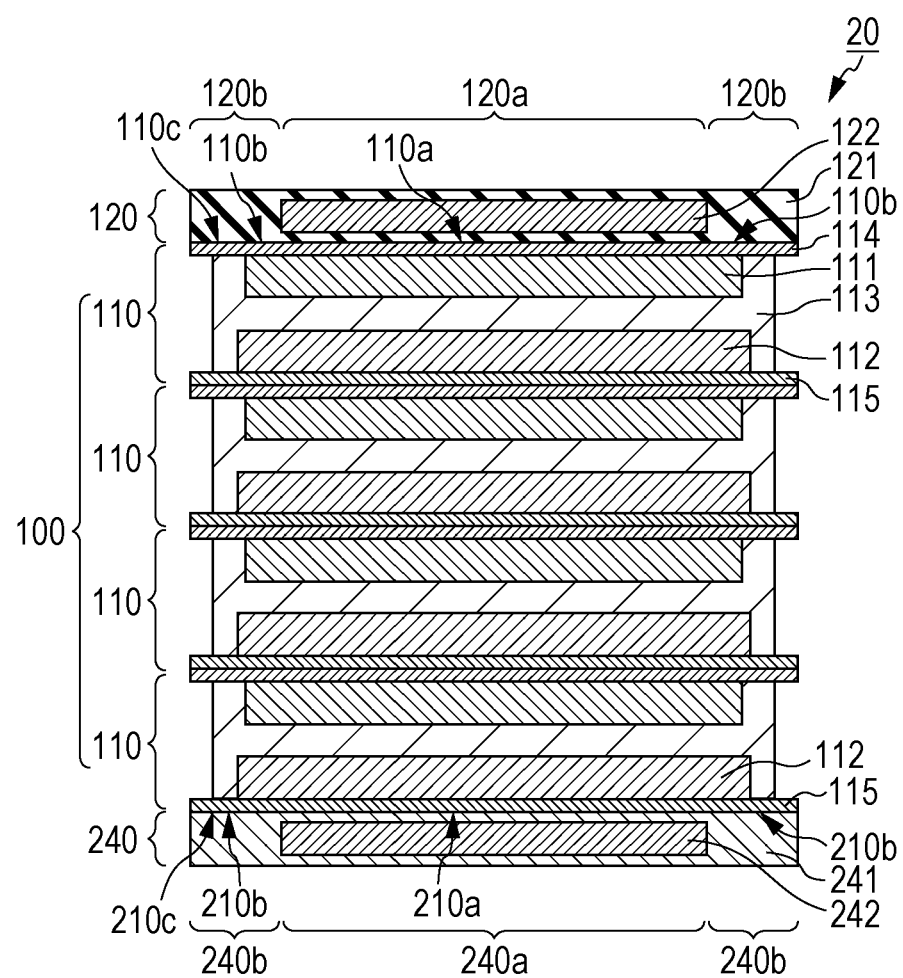
FIG. 2 is a sectional view illustrating a schematic structure of a battery according to Embodiment 2.

FIG. 2 is a sectional view illustrating a schematic structure of a battery 20 according to this embodiment. As illustrated in FIG. 2, comparing with the battery 10 according to Embodiment 1, the battery 20 according to this embodiment is different in additionally including a second member 240. In the following, different points from Embodiment 1 are primarily described and description of common points is omitted or simplified.

As illustrated in FIG. 2, the power generating element group 100 is sandwiched between the first member 120 and the second member 240. In other words, the second member 240 is in contact with a principal surface 210c of the power generating element group 100 on an opposite side to the principal surface 110c thereof. The principal surface 210c is an example of a second principal surface of one of the multiple power generating elements 110 included in the power generating element group 100. The principal surface 210c is a lower surface of one of the multiple power generating elements 110 included in the power generating element group 100, the one being positioned at a lowermost stage. More specifically, the principal surface 210c is a principal surface of the negative electrode current collector 115 of the power generating element 110 positioned at the lowermost stage on a side where the negative electrode 112 is not disposed.

For example, a central portion 210a and an end portion 210b of the principal surface 210c match respectively with the central portion 110a and the end portion 110b of the principal surface 110c in a plan view. For example, a shape of the central portion 210a in a plan view matches with that of the positive electrode 111 in a plan view. For example, the end portion 210b corresponds to the entire remaining portion of the principal surface 210c except for the central portion 210a in a plan view.

The second member 240 is in contact with the principal surface 210c of the power generating element 110. In this embodiment, the second member 240 is a member in the form of a flat plate. As illustrated in FIG. 2, the second member 240 includes a central region 240a and an end region 240b in a plan view. The central region 240a and the end region 240b are different regions in a plan view.

The central region 240a is an example of a second central region and overlaps with the central portion 210a of the principal surface 210c of the power generating element 110 in a plan view. In this embodiment, the central region 240a is in contact with the central portion 210a. A shape of the central region 240a in a plan view is rectangular, for example. However, the shape of the central region 240a in a plan view is not limited to a particular one and may be circular.

The end region 240b is an example of a second end region and overlaps with the end portion 210b of the principal surface 210c of the power generating element 110 in a plan view. In this embodiment, the end region 240b is in contact with the end portion 210b. The end region 240b has a ring-like shape surrounding the central region 240a in a plan view. For example, the end region 240b has a rectangular ring-like shape with a uniform width.

In this embodiment, the second member 240 is constituted in the same way as the first member 120. A Young's modulus of the end region 240b of the second member 240 is smaller than that of the central region 240a of the second member 240. More specifically, as illustrated in FIG. 2, the second member 240 includes a first portion 241 and a second portion 242. A Young's modulus of the first portion 241 is smaller than that of the second portion 242.

The first portion 241 is formed using, for example, a material selected from a selection group of the materials that can be used to form the first portion 121. The first portion 241 and the first portion 121 may be formed using the same material or different materials. Similarly, the second portion 242 is formed using, for example, a material selected from a selection group of the materials that can be used to form the second portion 122. The second portion 242 and the second portion 122 may be formed using the same material or different materials.

According to this embodiment, as described above, the first member 120 and the second member 240 are arranged respectively on an upper surface and a lower surface of the power generating element group 100. Therefore, when the pressure is applied to the first member 120 and the second member 240 from above and below with the battery 20 being confined, the pressure change at each of the boundary between the end region 120*b* and the central region 120*a* and a boundary between the end region 240*b* and the central region 240*a* is further relieved. As a result, the failure, such as cracking of the power generating element group 100, attributable to the abrupt pressure change is even less likely to occur.

Embodiment 3

Embodiment 3 will be described below.

Figure 3:
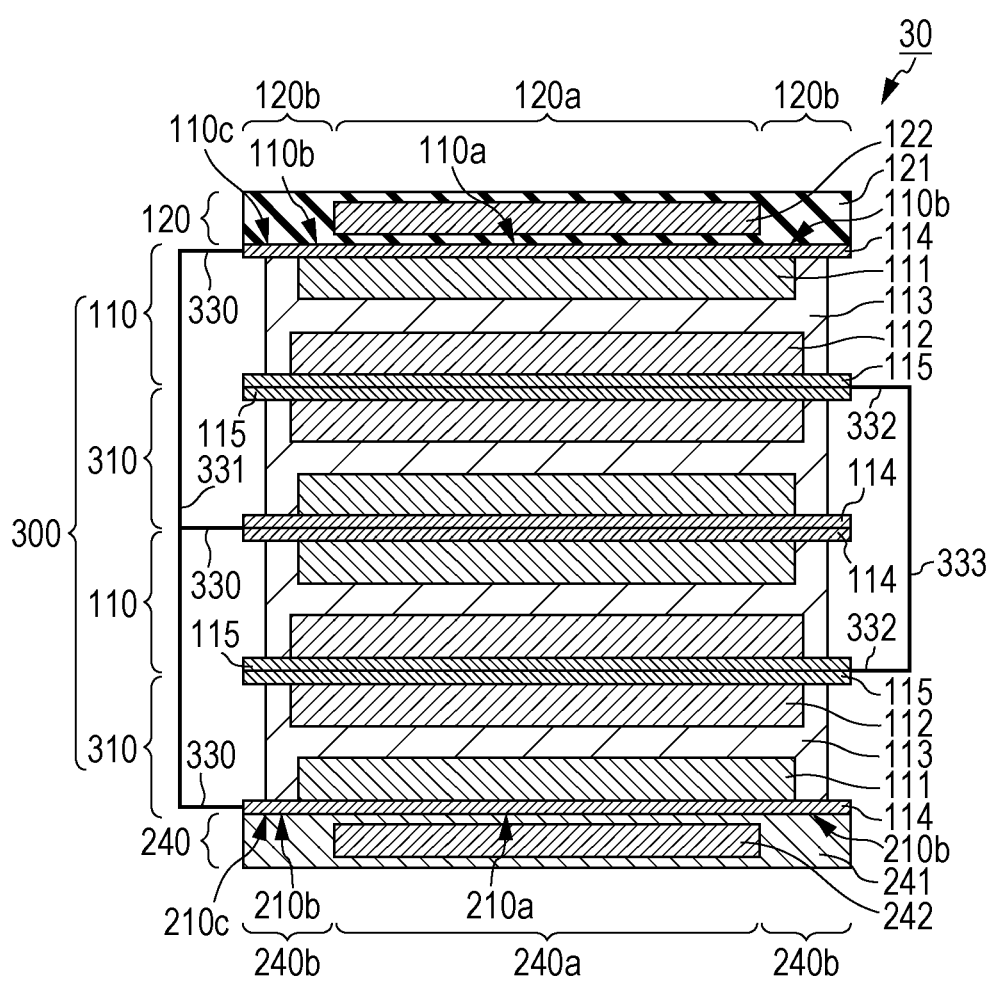
FIG. 3 is a sectional view illustrating a schematic structure of a battery according to Embodiment 3.
Figure 4:
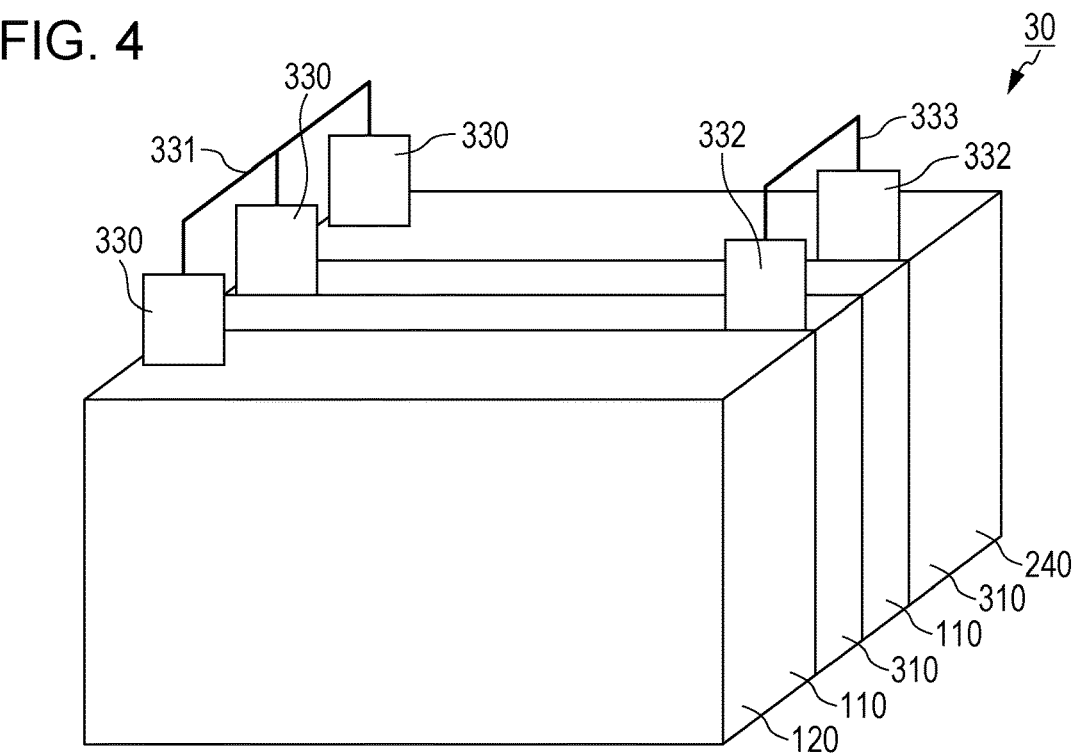
FIG. 4 is a perspective view illustrating the schematic structure of the battery according to Embodiment 3.

FIG. 3 is a sectional view illustrating a schematic structure of a battery 30 according to this embodiment. FIG. 4 is a perspective view illustrating the schematic structure of the battery 30 according to this embodiment. As illustrated in FIG. 3, comparing with the battery 20 according to Embodiment 2, the battery 30 according to this embodiment is different in including a power generating element group 300 instead of the power generating element group 100. In the following, different points from Embodiment 2 are primarily described and description of common points is omitted or simplified.

The power generating element group 300 according to this embodiment includes a parallel section in which at least two power generating elements are electrically connected in parallel. Here, the wording "connected in parallel" represents a state in which the positive electrode current collectors of the at least two power generating elements are electrically connected to each other and the negative electrode current collectors thereof are electrically connected to each other.

More specifically, as illustrated in FIG. 3, the power generating element group 300 includes two power generating elements 110 and two power generating elements 310. More specifically, the power generating elements 110 and the power generating elements 310 are alternately disposed in the lamination direction of the battery 30.

Each of the power generating elements 310 has a structure obtained by turning the power generating element 110 upside down. More specifically, the power generating element 310 includes, as in the power generating element 110, the positive electrode 111, the negative electrode 112, the solid electrolyte layer 113, the positive electrode current collector 114, and the negative electrode current collector 115.

In this embodiment, the positive electrode current collectors of the adjacent power generating elements directly contact with each other, and the negative electrode current collectors thereof directly contact with each other. More specifically, the positive electrode current collector 114 of the power generating element 310 and the positive electrode current collector 114 of the power generating element 110 are laminated in contact with each other. In this embodiment, a positive-electrode current collection terminal 330 is connected to each of the positive electrode current collector 114 of the power generating element 110 at the uppermost stage, a set of the two laminated positive electrode current collectors 114 positioned at a middle, and the positive electrode current collector 114 of the power generating element 310 at the lowermost stage. As illustrated in FIG. 4, three positive-electrode current collection terminals 330 are led out laterally from the battery 30. Those three positive-electrode current collection terminals 330 are electrically connected to one another by a conductive wiring (current-collection-terminal connecting member) 331.

Furthermore, the negative electrode current collector 115 of the power generating element 310 and the negative electrode current collector 115 of the power generating element 110 are laminated in contact with each other. In this embodiment, two sets of the two laminated negative electrode current collectors 115 are electrically connected through negative-electrode current collection terminal 332. As illustrated in FIG. 4, two negative-electrode current collection terminals 332 are led out laterally from the battery 30. Those two negative-electrode current collection terminals 332 are electrically connected to each other by a conductive wiring (current-collection-terminal connecting member) 333.

With the battery 30 according to this embodiment, as described above, since the multiple power generating elements 110 and 310 are connected in parallel, a capacity of the battery 30 can be increased.

The number of the power generating elements 110 and 310 connected in parallel is not limited to a particular value. As the number of the power generating elements connected in parallel increases, the battery 30 can provide a higher capacity. The number of the power generating elements connected in parallel may be set optionally in consideration of the easiness in handling when the all-solid-state battery is manufactured, the loading space of the apparatus or the like in which the all-solid-state battery is to be used, and so on. The power generating elements in number of, for example, 10 or more to 500 or less may be connected in parallel.

Embodiment 4

Embodiment 4 will be described below.

Figure 5:
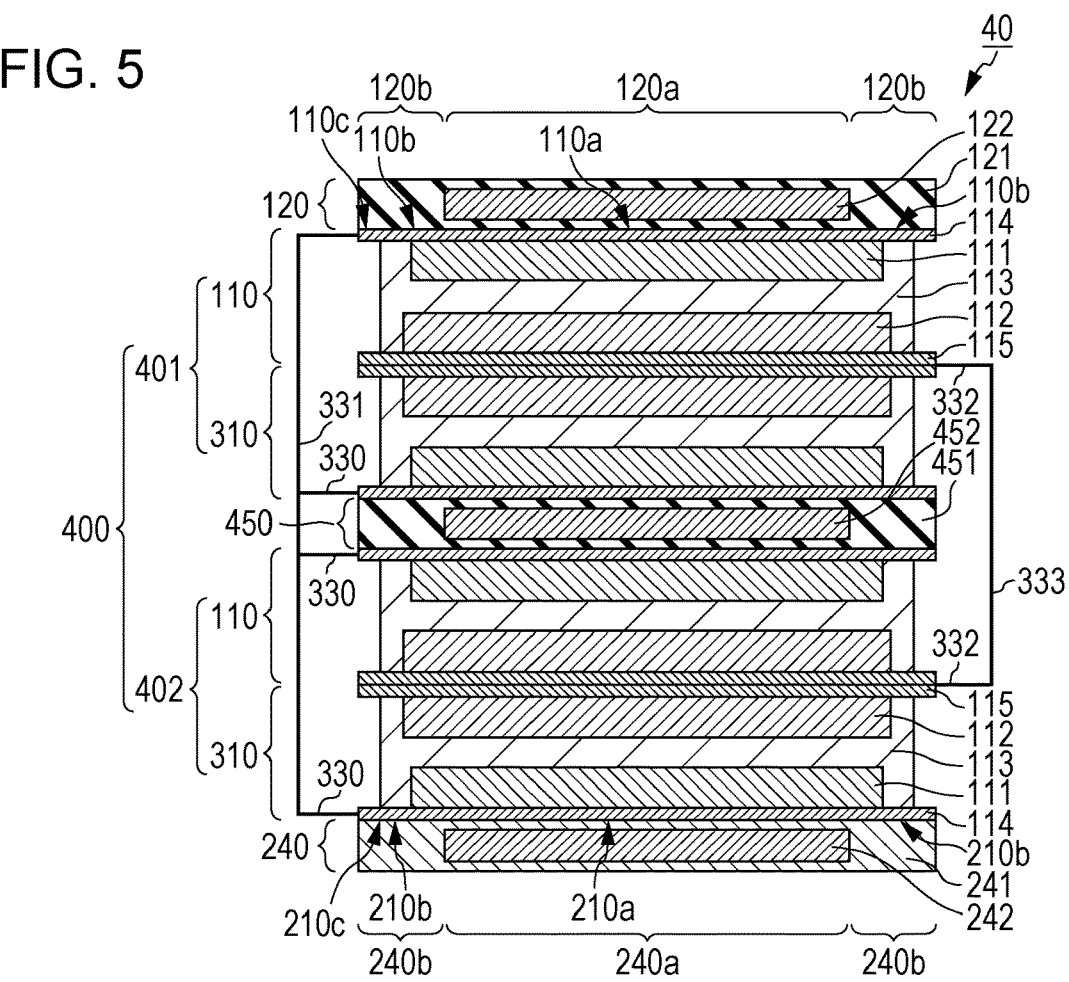
FIG. 5 is a sectional view illustrating a schematic structure of a battery according to Embodiment 4.

FIG. 5 is a sectional view illustrating a schematic structure of a battery 40 according to this embodiment. As illustrated in FIG. 5, comparing with the battery 30 according to Embodiment 3, the battery 40 according to this embodiment is different in including a power generating element group 400 instead of the power generating element group 300 and additionally including a third member 450. In the following, different points from Embodiment 3 are primarily described and description of common points is omitted or simplified.

As illustrated in FIG. 5, the power generating element group 400 includes multiple parallel sections 401 and 402. The parallel section 401 is a section in which the power generating element 110 and the power generating element 310 on an upper stage side are electrically connected in parallel. The parallel section 402 is a section in which the power generating element 110 and the power generating element 310 on a lower stage side are electrically connected in parallel.

The number of the power generating elements included in each of the parallel sections 401 and 402 is not limited to a particular value. The number of the power generating elements included in the parallel section 401 may be different from the number of the power generating elements included in the parallel section 402. Furthermore, the power generating element group 400 may include only one power generating element 110 or 310 instead of one between the parallel sections 401 and 402. In other words, the power generating element group 400 may include only one parallel section.

The third member 450 that is an example of a third member in the present disclosure is sandwiched between adjacent two of the multiple parallel sections. More specifically, the third member 450 is sandwiched between the parallel section 401 and the parallel section 402 adjacent to each other. In more detail, the third member 450 is in contact with a lower surface of the power generating element 310 on an upper stage side and an upper surface of the power generating element 110 on a lower stage side. The third member 450 may also be an example of the first member in the present disclosure. In such a case, the lower surface of the power generating element 310 on the upper stage side and the upper surface of the power generating element 110 on the lower stage side is an example of the first principal surface in the present disclosure.

The third member 450 is constituted in the same way as the first member 120. A Young's modulus of an end region of the third member 450 is smaller than that of a central region of the third member 450. Here, the end region and the central region of the third member 450 overlap respectively with the end region and the central region of the first member 120 in a plan view. More specifically, the third member 450 includes a first portion 451 and a second portion 452. A Young's modulus of the first portion 451 is smaller than that of the second portion 452.

The first portion 451 is formed using, for example, a material selected from a selection group of materials that can be used to form the first portion 121. The first portion 451 and the first portion 121 may be formed using the same material or different materials. Similarly, the second portion 452 is formed using, for example, a material selected from a selection group of materials that can be used to form the second portion 122. The second portion 452 and the second portion 122 may be formed using the same material or different materials.

In the battery 40 according to this embodiment, as described above, the third member 450 is arranged between the power generating elements. Therefore, even when the number of the laminated power generating elements increases, the pressure loss generated inside the power generating element group 400 can be suppressed and a pressure relieving effect by the third member 450 can be developed sufficiently. Stated in another way, it is possible to suppress application of the uniform confining pressure inside the power generating element group 400 and hence to reduce the risk of the short-circuit failure.

Multiple third members 450 may be disposed within the power generating element group 400. For example, the third member 450 may be disposed between each adjacent two of the power generating elements.

Moreover, in the battery 40 illustrated in FIG. 5, the third member 450 is electrically insulating. Accordingly, the positive-electrode current collection terminals 330 are disposed for the positive electrode current collector 114 of the power generating element 310 on an upper stage side and the positive electrode current collector 114 of the power generating element 110 on a lower stage side in a one-to-one relationship and are electrically connected to each other through the conductive wiring 331. Thus, the parallel section 401 and the parallel section 402 are electrically connected in parallel.

Modification

A modification of Embodiment 4 is described here.

Figure 6:
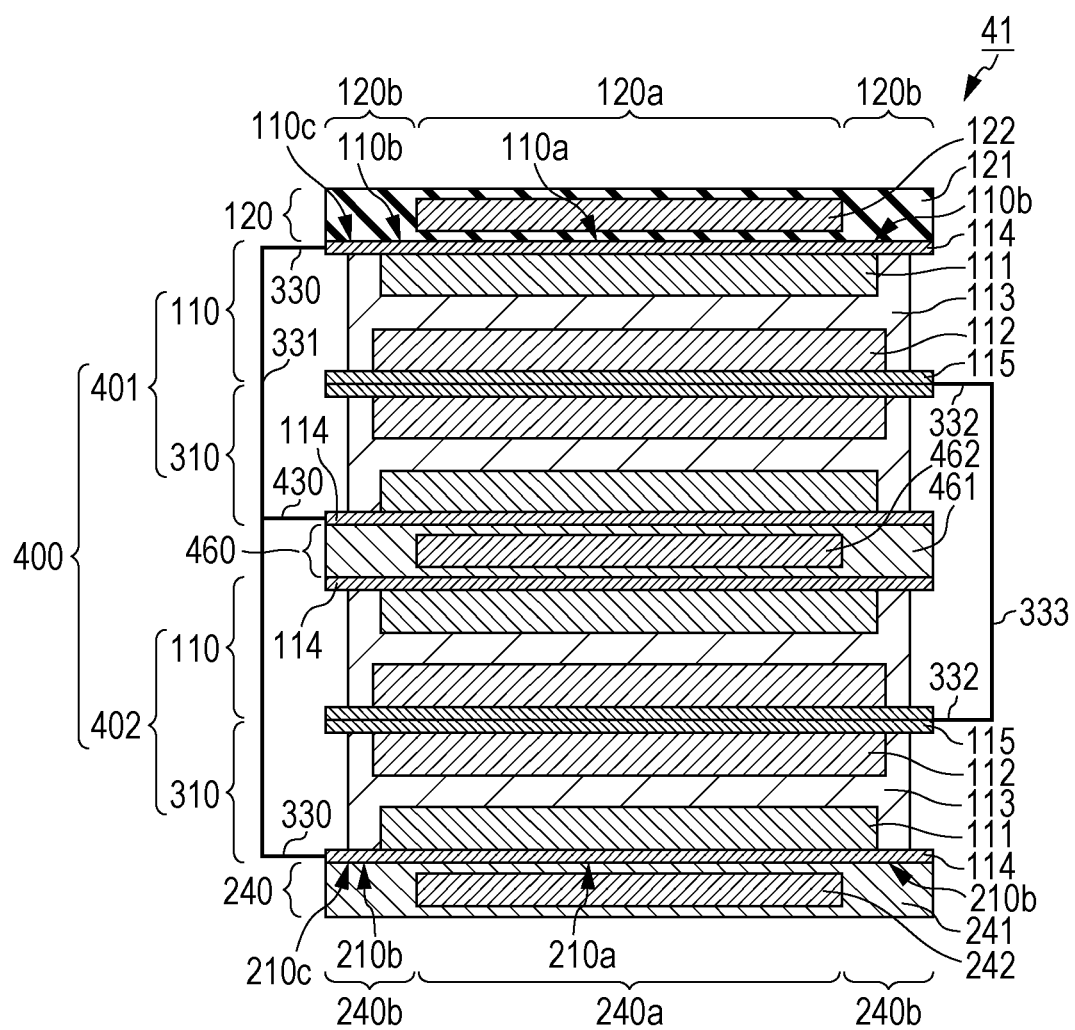
FIG. 6 is a sectional view illustrating a schematic structure of a battery according to a modification of Embodiment 4.

FIG. 6 is a sectional view illustrating a schematic structure of a battery 41 according to the modification of this embodiment. As illustrated in FIG. 6, the battery 41 according to this modification includes a third member 460 instead of the third member 450. The third member 460 has electrical conductivity unlike the third member 450.

As illustrated in FIG. 6, the third member 460 includes a first portion 461 and a second portion 462. In this modification, each of the first portion 461 and the second portion 462 has electrical conductivity.

For example, resin contained in the first portion 461 contains a conductive polymer. The conductive polymer contained in the first portion 461 may be given as, for example, polyacetylene, polyaniline, polypyrrole, or polythiophene.

Each of the first portion 461 and the second portion 462 may contain metal. The metal contained in the first portion 461 and the second portion 462 is, for example, one selected from a selection group of metals that can be used as the metals to be contained in the second portion 122. The metal contained in the first portion 461 and the metal contained in the second portion 462 may be the same or different from each other.

When each of the first portion 461 and the second portion 462 contains metal, it is easier to reduce a difference in Young's modulus between the first and second portions, whereby the pressure change at the boundary between the end region and the central region is further relieved. As a result, the failure, such as cracking of the power generating element 110 or 310, attributable to the abrupt pressure change is even less likely to occur.

Since the third member 460 has electrical conductivity, the positive electrode current collector 114 of the power generating element 310 on the upper stage side and the positive electrode current collector 114 of the power generating element 110 on the lower stage side are electrically connected through the third member 460. Accordingly, the battery 41 is just required to include a positive-electrode current collection terminal 430 that is connected to one of the positive electrode current collector 114 of the power generating element 310 on the upper stage side and the positive electrode current collector 114 of the power generating element 110 on the lower stage side. It is hence possible to reduce the number of the positive-electrode current collection terminals and to simplify the structure of the battery 41.

Furthermore, since electron conductivity is given to the third member 460, the third member 460 can be further used as a current collector. With the third member 460 functioning also as the current collector, the power generating element 110 or 310 is no longer required to include the current collector, whereby a thickness of the power generating element 110 or 310 can be reduced. For example, the power generating element 310 included in the parallel section 401 is no longer required to include the positive electrode current collector 114. Similarly, the power generating element 110 included in the parallel section 402 is no longer required to include the positive electrode current collector 114. Thus, since the thickness of the power generating element 110 or 310 is reduced, the energy density of the power generating element 110 or 310 can be increased. At least one of the first member 120 or the second member 240 may have electrical conductivity like the third member 460.

Embodiment 5

Embodiment 5 will be described below.

Figure 7:
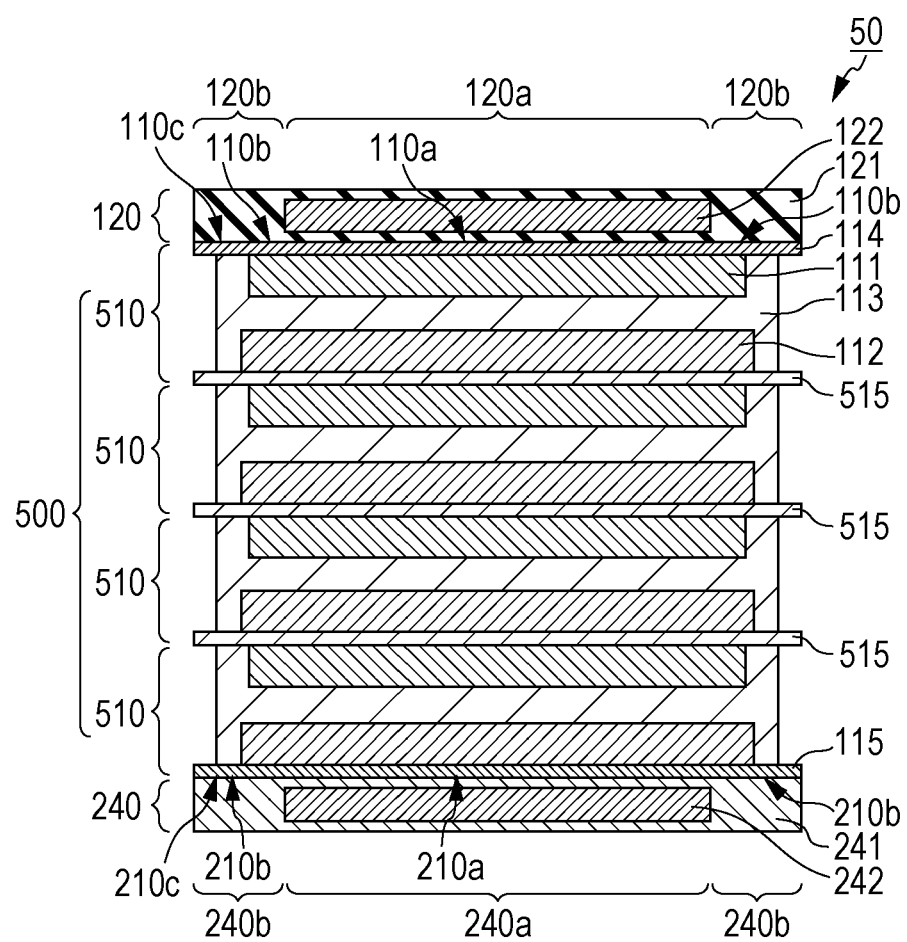
FIG. 7 is a sectional view illustrating a schematic structure of a battery according to Embodiment 5.

FIG. 7 is a sectional view illustrating a schematic structure of a battery 50 according to this embodiment. As illustrated in FIG. 7, comparing with the battery 20 according to Embodiment 2, the battery 50 according to this embodiment is different in including a power generating element group 500 instead of the power generating element group 100. In the following, different points from Embodiment 2 are primarily described and description of common points is omitted or simplified.

The power generating element group 500 according to this embodiment includes, as in Embodiment 2, a section in which the multiple power generating elements are connected in series. Comparing with the power generating element group 100 according to Embodiment 2, the power generating element group 500 according to this embodiment includes one bipolar current collector 515 instead of the positive electrode current collector 114 and the negative electrode current collector 115 adjacent to each other.

More specifically, as illustrated in FIG. 7, the power generating element group 500 includes the multiple power generating elements 510. Each of the multiple power generating elements 510 does not include at least one of the positive electrode current collector 114 or the negative electrode current collector 115. For example, the power generating element 510 at the uppermost stage includes the bipolar current collector 515 instead of the negative electrode current collector 115. The power generating element 510 at the lowermost stage does not include the positive electrode current collector 114. The two power generating elements 510 at the middle include the bipolar current collector 515 in common without including the positive electrode current collector 114 and the negative electrode current collector 115.

The bipolar current collector 515 is an electrode with both the functions of the positive electrode current collector and the negative electrode current collector. More specifically, the bipolar current collector 515 functions as one between the positive electrode current collector and the negative electrode current collector of one power generating element 510 including the bipolar current collector 515 and further functions as the other between the positive electrode current collector and the negative electrode current collector of another power generating element 510 adjacent to the above one. In an example illustrated in FIG. 7, the bipolar current collector 515 functions as the negative electrode current collector of one power generating element 510 including the bipolar current collector 515 and further functions as the positive electrode current collector of another power generating element 510 adjacent to the above one.

The bipolar current collector 515 may be given as, for example, a porous or nonporous sheet or film made of a metal material such as stainless steel, nickel, copper, or an alloy of any of those materials. The sheet or the film is, for example, a metal foil or mesh.

A thickness of the bipolar current collector 515 is, for example, more than or equal to 1 µm and less than or equal to 30 µm. When the thickness of the bipolar current collector 515 is more than or equal to 1 µm, mechanical strength is sufficient and the bipolar current collector 515 is less likely to crack or break. When the thickness of the bipolar current collector 515 is less than or equal to 30 µm, a drop of the energy density of the battery can be suppressed.

With the battery 50 according to this embodiment, as described above, because of including the bipolar current collector 515, the number of the current collectors can be reduced. Hence the thickness of the power generating element group 500 can be reduced and the energy density of the battery can be increased.

Embodiment 6

Embodiment 6 will be described below.

Figure 8:
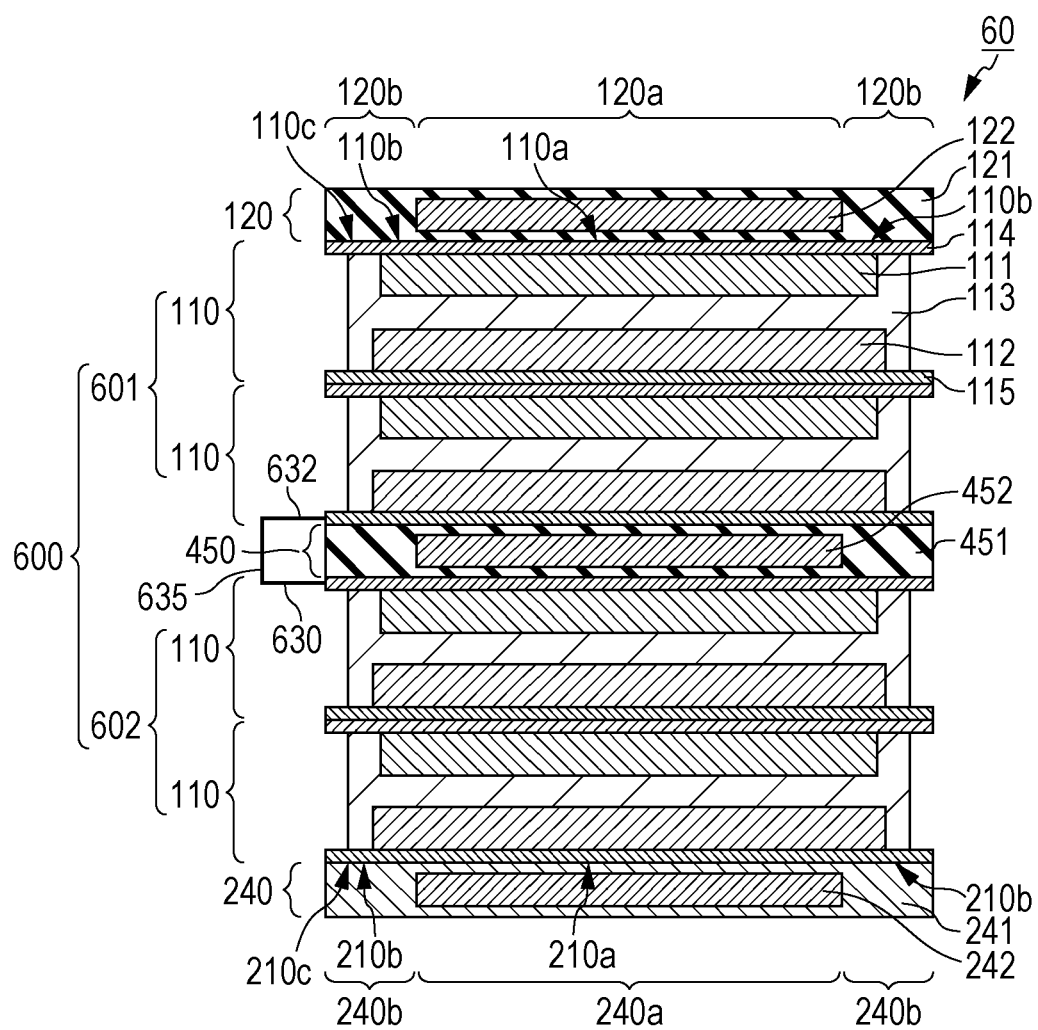
FIG. 8 is a sectional view illustrating a schematic structure of a battery according to Embodiment 6.

FIG. 8 is a sectional view illustrating a schematic structure of a battery 60 according to this embodiment. As illustrated in FIG. 8, comparing with the battery 20 according to Embodiment 2, the battery 60 according to this embodiment is different in including a power generating element group 600 instead of the power generating element group 100 and additionally including the third member 450. In the following, different points from Embodiment 2 are primarily described and description of common points is omitted or simplified.

As illustrated in FIG. 8, the power generating element group 600 includes multiple series sections 601 and 602. The series section 601 is a section in which two power generating elements 110 on an upper stage side are electrically connected in series. The series section 602 is a section in which two power generating elements 110 on a lower stage side are electrically connected in series.

The number of the power generating elements included in each of the series sections 601 and 602 is not limited to a particular value. The number of the power generating elements included in the series section 601 may be different from the number of the power generating elements included in the series section 602. Furthermore, the power generating element group 600 may include only one power generating element 110 instead of one between the series sections 601 and 602. In other words, the power generating element group 600 may include only one series section.

The third member 450 that is an example of the third member in the present disclosure is sandwiched between adjacent two of the multiple series sections. More specifically, the third member 450 is sandwiched between the series section 601 and the series section 602 adjacent to each other. In more detail, the third member 450 is in contact with a lower surface of the power generating element 110 at a lowermost stage in the series section 601 and an upper surface of the power generating element 110 at an uppermost stage in the series section 602. The third member 450 may also be an example of the first member in the present disclosure. In such a case, the lower surface of the power generating element 310 on the upper stage side and the upper surface of the power generating element 110 on the lower stage side is an example of the first principal surface in the present disclosure.

In the battery 60 according to this embodiment, as described above, the third member 450 is arranged between the power generating elements. Therefore, even when the number of the laminated power generating elements increases, the pressure loss generated inside the power generating element group 600 can be suppressed and a pressure relieving effect by the third member 450 can be developed sufficiently. Stated in another way, it is possible to suppress application of the uniform confining pressure inside the power generating element group 600 and hence to reduce the risk of the short-circuit failure.

Multiple third members 450 may be disposed within the power generating element group 600. For example, the third members 450 may be each disposed between adjacent two of the power generating elements.

Moreover, the third member 450 is electrically insulating as in Embodiment 4. Accordingly, as illustrated in FIG. 8, a negative-electrode current collection terminal 632 is disposed for the negative electrode current collector 115 of the power generating element 110 at the lowermost stage in the series section 601, and a positive-electrode current collection terminal 630 is disposed for the positive electrode current collector 114 of the power generating element 110 at the uppermost stage in the series section 602. The positive-electrode current collection terminal 630 and the negative-electrode current collection terminal 632 are electrically connected to each other through a conductive wiring 635. Thus, the series section 601 and the series section 602 are electrically connected in series.

Modification

A modification of Embodiment 6 is described here.

Figure 9:
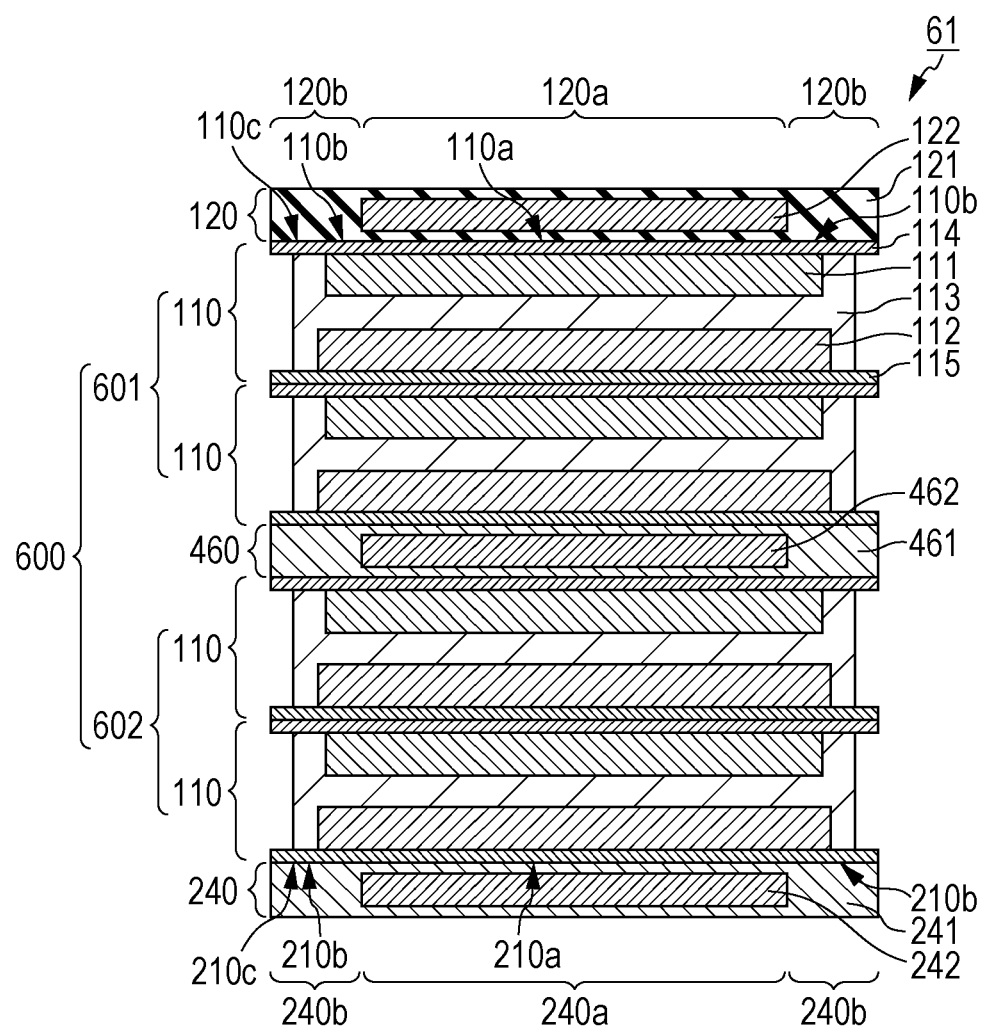
FIG. 9 is a sectional view illustrating a schematic structure of a battery according to a modification of Embodiment 6.

FIG. 9 is a sectional view illustrating a schematic structure of a battery 61 according to the modification of this embodiment. As illustrated in FIG. 9, the battery 61 according to this modification includes a third member 460 instead of the third member 450. The third member 460 has electrical conductivity as in the modification of Embodiment 4.

Since the third member 460 has electrical conductivity, the negative electrode current collector 115 of the power generating element 110 at the lowermost stage in the series section 601 and the positive electrode current collector 114 of the power generating element 110 at the uppermost stage in the series section 602 are electrically connected through the third member 460. In the battery 61, therefore, the power generating elements can be electrically connected in series without disposing the positive-electrode current collection terminal and the negative-electrode current collection terminal. As a result, the structure of the battery 61 can be simplified.

Embodiment 7

Embodiment 7 will be described below.

Figure 10:
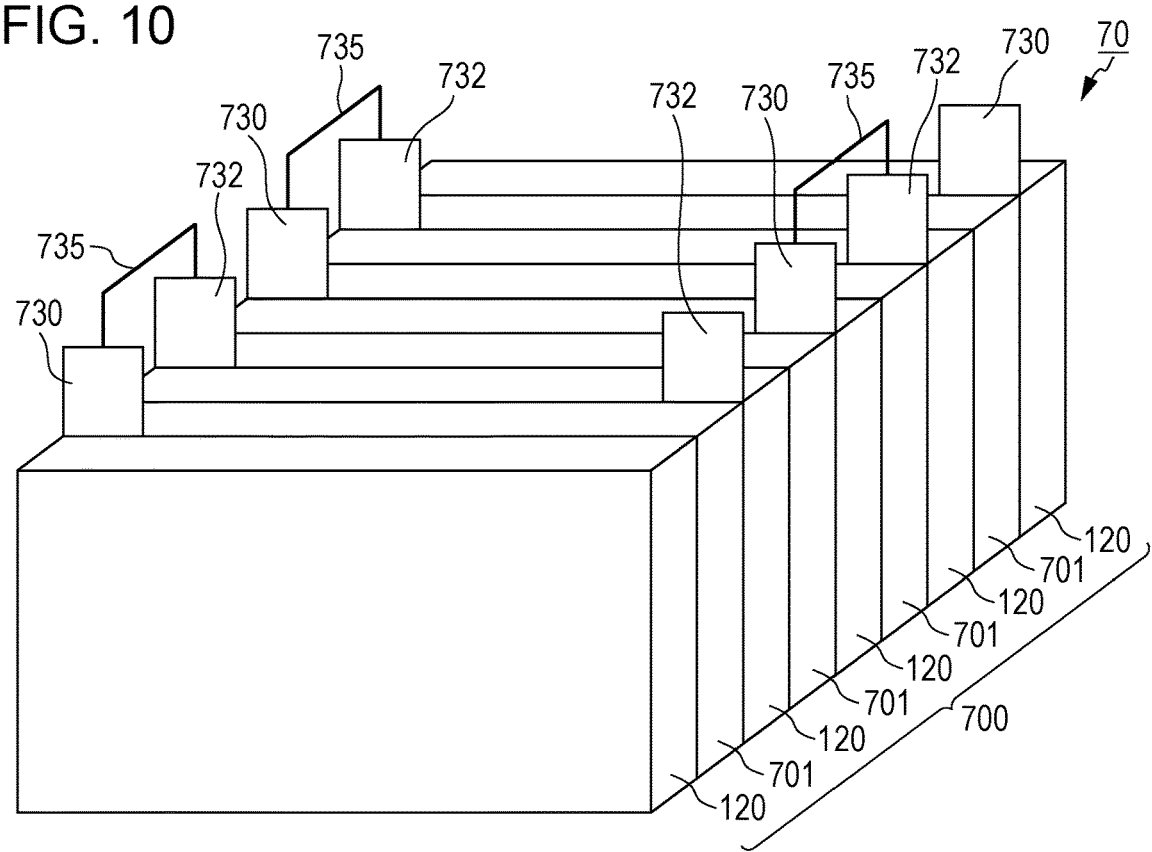
FIG. 10 is a perspective view illustrating a schematic structure of the battery according to Embodiment 7.

FIG. 10 is a perspective view illustrating a schematic structure of a battery 70 according to this embodiment. As illustrated in FIG. 10, comparing with the battery 10 according to Embodiment 1, the battery 70 according to this embodiment is different in including a power generating element group 700 instead of the power generating element group 100 and including multiple first members 120. In the following, different points from Embodiment 1 are primarily described and description of common points is omitted or simplified.

The power generating element group 700 includes multiple parallel sections 701 in each of which two or more power generating elements are electrically connected in parallel. Each of the parallel sections 701 has, for example, the laminated structure made up of the power generating element 110 and the power generating element 310 as illustrated in FIG. 3. The number of the power generating elements included in the parallel section 701 is not limited to a particular value. The numbers of the power generating elements included in the individual parallel sections 701 may be different from each other.

The multiple parallel sections 701 are electrically connected in series. More specifically, as illustrated in FIG. 10, a positive-electrode current collection terminal 730 and a negative-electrode current collection terminal 732 are led out laterally from the battery 70. The positive-electrode current collection terminal 730 and the negative-electrode current collection terminal 732 are connected by a conductive wiring 735, whereby the multiple parallel sections 701 are electrically connected in series.

The positive-electrode current collection terminal 730 and the negative-electrode current collection terminal 732 are disposed in end portions of the parallel sections 701, but terminal arrangement is not limited to that case. The positive-electrode current collection terminal 730 and the negative-electrode current collection terminal 732 may be positioned on an inner side of the power generating element 110 when viewed in a thickness direction of the battery 70. For example, at least one of the positive-electrode current collection terminal 730 or the negative-electrode current collection terminal 732 may be positioned in a central region of the parallel section 701 when viewed in a thickness direction of the battery 70. The above-mentioned point is similarly applied to Embodiment 8 described later.

In this embodiment, the first member 120 is arranged between the two parallel sections 701 adjacent to each other. Even when the number of the parallel sections 701 connected in series increases, the pressure loss generated inside the power generating element group 700 can be suppressed and the pressure relieving effect by the multiple first members 120 can be developed sufficiently. Hence the risk of the short-circuit failure can be reduced. In addition, since the number of the power generating elements included in the battery 70 can be increased, the battery with a higher capacity and a higher voltage can be realized.

The first member 120 may be arranged inside the parallel section 701. The multiple parallel sections 701 may be arranged between the two first member 120 adjacent to each other.

Modification

A modification of Embodiment 7 is described here.

Figure 11:
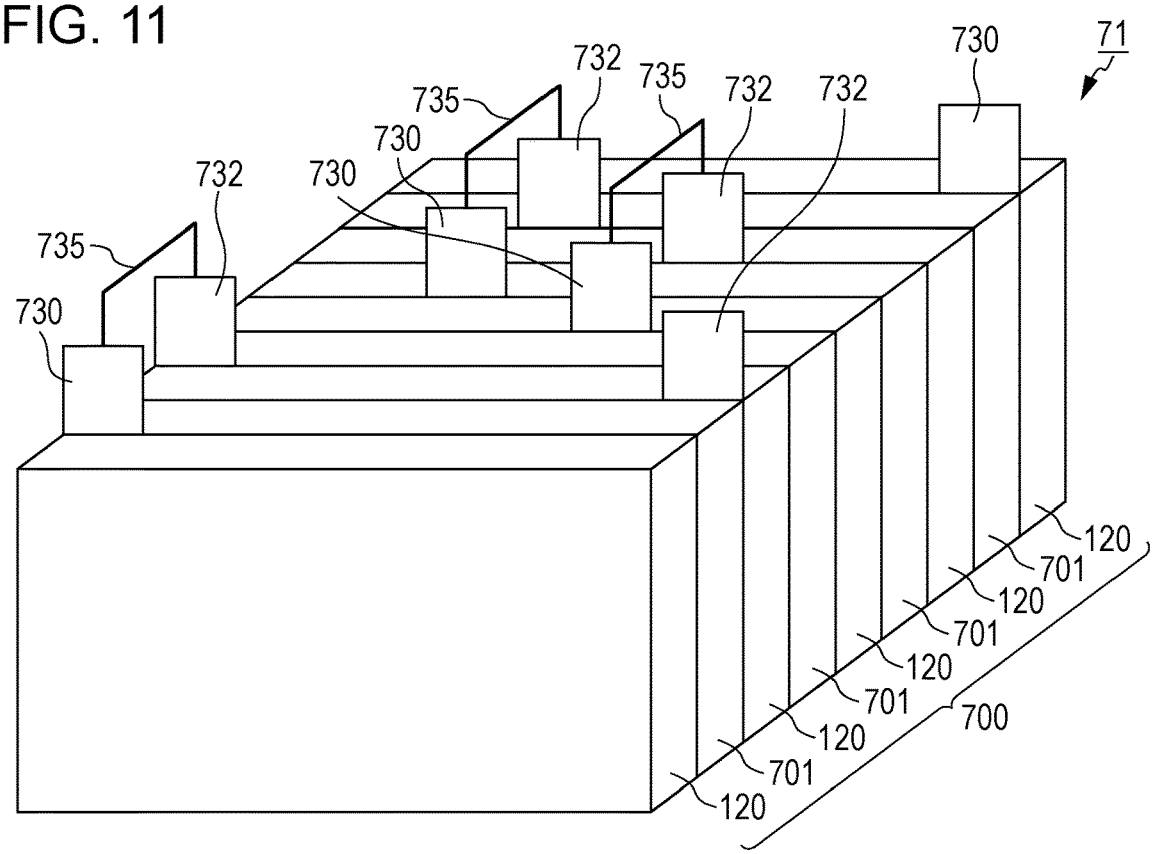
FIG. 11 is a perspective view illustrating a schematic structure of a battery according to a modification of Embodiment 7.
Figure 12:
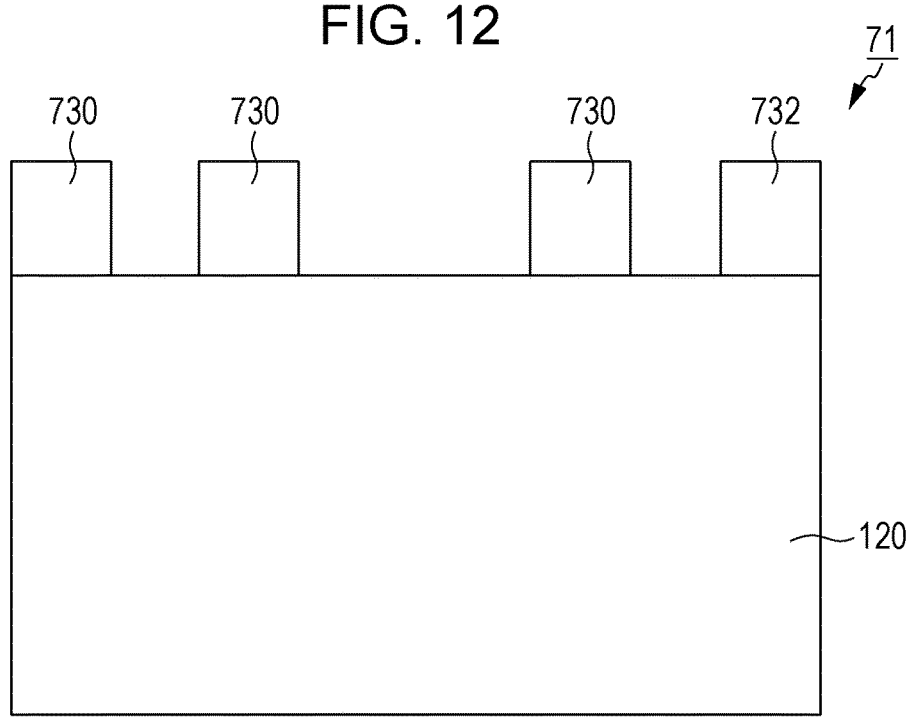
FIG. 12 is a plan view illustrating the schematic structure of the battery according to the modification of Embodiment 7.

FIG. 11 is a perspective view illustrating a schematic structure of a battery 71 according to this modification. FIG. 12 is a plan view illustrating the schematic structure of the battery 71 according to this modification. As illustrated in FIG. 11, comparing with the battery 70 according to Embodiment 7, the battery 71 according to this modification is different in positions of the positive-electrode current collection terminal 730, the negative-electrode current collection terminal 732, and the wiring (current-collection-terminal connecting member) 735.

In this modification. as illustrated in FIGS. 11 and 12, one of the positive-electrode current collection terminals 730 and one of the negative-electrode current collection terminals 732 in the two parallel sections 701 adjacent to each other, the one positive-electrode current collection terminal 730 and the one negative-electrode current collection terminals 732 being not connected by the conductive wiring 735, are arranged to be not aligned with each other in a plan view. Such an arrangement can inhibit the positive-electrode current collection terminal 730 and the negative-electrode current collection terminal 732 from directly contacting with each other and can suppress the occurrence of a short circuit. For example, the risk of the short circuit can be reduced by arranging the positive-electrode current collection terminal 730 and the negative-electrode current collection terminal 732 to be positioned, respectively, on a center side and an outer periphery side of the power generating element group 700 in a plan view, as illustrated in FIGS. 11 and 12.

Embodiment 8

Embodiment 8 will be described below.

Figure 13:
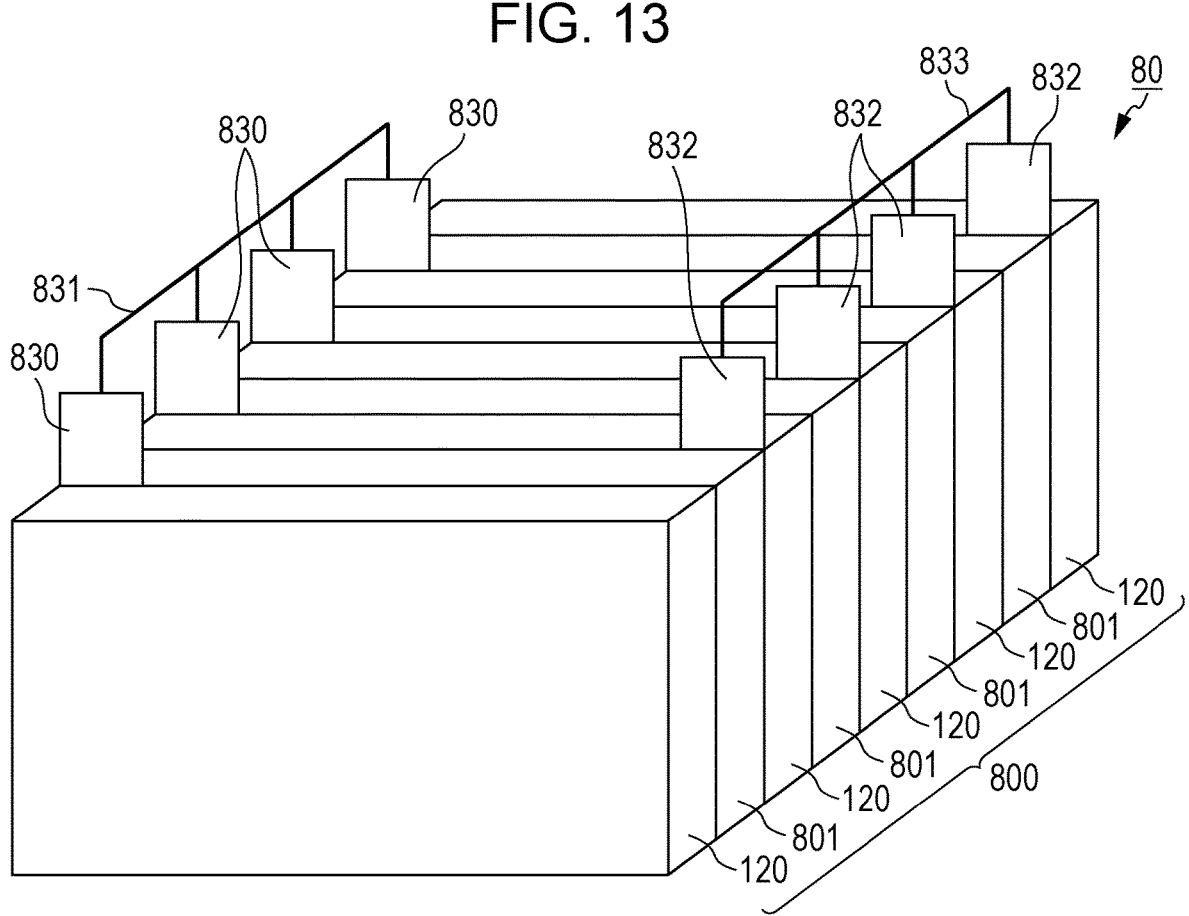
FIG. 13 is a perspective view illustrating a schematic structure of a battery according to Embodiment 8.

FIG. 13 is a perspective view illustrating a schematic structure of a battery 80 according to this embodiment. As illustrated in FIG. 13, comparing with the battery 10 according to Embodiment 1, the battery 80 according to this embodiment is different in including a power generating element group 800 instead of the power generating element group 100 and including multiple first members 120. In the following, different points from Embodiment 1 are primarily described and description of common points is omitted or simplified.

The power generating element group 800 includes multiple series sections 801 in each of which two or more power generating elements are electrically connected in series. Each of the series sections 801 has, for example, the laminated structure made up of the multiple power generating elements 110 as illustrated in FIG. 1. The number of the power generating elements included in the series section 801 is not limited to a particular value. The numbers of the power generating elements included in the individual series sections 801 may be different from each other.

The multiple series sections 801 are electrically connected in parallel. More specifically, as illustrated in FIG. 13, a positive-electrode current collection terminal 830 and a negative-electrode current collection terminal 832 are led out laterally from the battery 80. Multiple positive-electrode current collection terminals 830 are electrically connected to one another by a wiring 831, and multiple negative-electrode current collection terminals 832 are electrically connected to one another by a wiring 833. Thus, the multiple series sections 801 are electrically connected in parallel.

In this embodiment, the first member 120 is arranged between the two series sections 801 adjacent to each other. Even when the number of the series sections 801 connected in parallel increases, the pressure loss generated inside the power generating element group 800 can be suppressed and the pressure relieving effect by the multiple first members 120 can be developed sufficiently. Hence the risk of the short-circuit failure can be reduced. In addition, since the number of the power generating elements included in the battery 80 can be increased, the battery with a higher capacity and a higher voltage can be realized.

The first member 120 may be arranged within the series section 801. The multiple series sections 801 may be arranged between the two first members 120 adjacent to each other.

Other Embodiments

The battery according to one or more aspects has been described above in connection with the embodiments, but the present disclosure is not limited to the above-described embodiments. Batteries according to other aspects, which are obtained by applying various modifications conceivable by those skilled in the art to the above-described embodiments and which are constituted by combining the components in the different embodiments with each other, also fall within the scope of the present disclosure insofar as not departing from the gist of the present disclosure.

For example, while the above-described embodiments represent the example in which the first member 120 has a uniform thickness, the thickness of the first member 120 may be not uniform. More specifically, the thickness of the first member 120 in the end region 120b may be thicker than that in the central region 120a. In that case, the central region 120a of the first member 120 may not need to contact with the central portion 110a of the principal surface 110c of the power generating element group 100. Instead, the thickness of the first member 120 in the end region 120b may be thinner than that in the central region 120a. In that case, the end region 120b of the first member 120 may not need to contact with the end portion 110b of the principal surface 110c of the power generating element group 100. The above point is similarly applied to the second member 240 and the third members 450 and 460.

For example, the area of the second portion 122 of the first member 120 may be larger than that of the positive electrode 111 or the negative electrode 112 in a plan view. In that case, since a contact degree between particles is increased due to pressure applied to central regions of the positive electrode 111 and the negative electrode 112, the particle boundary resistance is reduced and the charge-discharge characteristics can be improved.

For example, the first member may be an exterior body covering the power generating element group. In another example, the first member may be bonded to an outer surface of the exterior body covering the power generating element group. In still another example, the first member may be bonded to an inner surface of the exterior body covering the power generating element group, or may be arranged between the exterior body and the power generating element group.

For example, the first member may not need to be disposed on the upper surface of the power generating element at the uppermost stage. In another example, the first member may not need to be disposed on each of the upper surface of the power generating element at the uppermost stage and the lower surface of the power generating element at the lowermost stage. The first member may be disposed only between adjacent two of the multiple power generating elements included in the power generating element group.

Various alterations, replacements, additions, omissions, and so on can be made on the above-described embodiments within the scope defined in Claims and the scope equivalent to Claims.

The battery according to the present disclosure can be used as, for example, an all-solid-state lithium secondary battery.

What is claimed is:
1. A battery comprising:
a power generating element group including multiple laminated power generating elements each of which contains a solid electrolyte; and
a first member in contact with a first principal surface of a first power generating element that is one among the multiple power generating elements, wherein:
the first principal surface includes:
a central portion; and
an end portion with a ring-like shape surrounding the central portion in a plan view of the first principal surface,
the first member includes:
a first central region overlapping with the central portion of the first principal surface in a plan view of the first member; and
a first end region with a ring-like shape surrounding the first central region and overlapping with the end portion of the first principal surface in the plan view of the first member,
a thickness of the first central region is equal to a thickness of the first end region,
at least one of the first central region or the first end region is in contact with the first principal surface, and
a Young's modulus of the first end region is smaller than a Young's modulus of the first central region.

2. The battery according to claim 1, wherein
the first central region is in contact with the central portion of the first principal surface, and
the first end region is in contact with the end portion of the first principal surface.

3. The battery according to claim 1, wherein
the first power generating element includes a current collector, and
the first member is in contact with a surface of the current collector.

4. The battery according to claim 1, wherein the power generating element group includes a section in which two or more power generating elements are electrically connected in series.

5. The battery according to claim 1, wherein the power generating element group includes a section in which two or more power generating elements are electrically connected in parallel.

6. The battery according to claim 1, wherein the first member is sandwiched between two power generating elements adjacent to each other within the power generating element group.

7. The battery according to claim 1, further comprising a third member, wherein
the multiple power generating elements are four or more power generating elements,
the power generating element group includes multiple series sections in each of which two or more power generating elements are electrically connected in series,
the third member is positioned between adjacent two of the multiple series sections, and
the adjacent two of the multiple series sections are electrically connected in parallel.

8. The battery according to claim 1, further comprising a third member, wherein
the multiple power generating elements are four or more power generating elements,
the power generating element group includes multiple parallel sections in each of which two or more power generating elements are electrically connected in parallel,
the third member is positioned between adjacent two of the multiple parallel sections, and
the adjacent two of the multiple parallel sections are electrically connected in series.

9. The battery according to claim 1, wherein
the first power generating element is a power generating element that is positioned at an uppermost stage in the power generating element group, and
the first principal surface is an upper surface of the first power generating element.

10. The battery according to claim 9, further comprising a second member in contact with a second principal surface of a second power generating element that is another one among the multiple power generating elements, wherein:
the second principal surface includes:
a central portion; and
an end portion with a ring-like shape surrounding the central portion in a plan view of the second principal surface,
the second member includes:
a second central region overlapping with the central portion of the second principal surface in a plan view of the second member; and
a second end region with a ring-like shape surrounding the second central region and overlapping with the end portion of the second principal surface in the plan view of the second member,
at least one of the second central region or the second end region is in contact with the second principal surface,
a Young's modulus of the second end region is smaller than a Young's modulus of the second central region,
the second power generating element is a power generating element that is positioned at a lowermost stage in the power generating element group, and
the second principal surface is a lower surface of the second power generating element.

11. The battery according to claim 10, wherein
a thickness of the second central region is equal to a thickness of the second end region.

12. The battery according to claim 1, wherein
the first member includes a first portion and a second portion,
a Young's modulus of the first portion is smaller than a Young's modulus of the second portion,
at least part of the first portion is positioned within the first end region, and
at least part of the second portion is positioned within the first central region.

13. The battery according to claim 12, wherein
the first portion covers a periphery of the second portion, and
another part of the first portion is positioned within the first central region.

14. The battery according to claim 12, wherein the first portion and the second portion contain metal.

15. The battery according to claim 12, wherein
the first portion contains resin, and
the second portion contains metal.

16. The battery according to claim 15, wherein the resin is a conductive polymer.

17. The battery according to claim 12, wherein
the first power generating element includes an electrode layer, and
an area of the second portion in the plan view of the first member is smaller than an area of the electrode layer in a plan view of the electrode layer.

18. The battery according to claim 17, wherein the first member is in contact with a surface of the electrode layer.

19. The battery according to claim 18, wherein the first member is a current collector.

* * * * *